(12) United States Patent
Yamashita et al.

(10) Patent No.: US 11,454,282 B2
(45) Date of Patent: Sep. 27, 2022

(54) SINTERED BEARING

(71) Applicant: NTN CORPORATION, Osaka (JP)

(72) Inventors: Tomonori Yamashita, Aichi (JP); Yoshinori Ito, Aichi (JP); Takashi Yamaguchi, Aichi (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/878,170

(22) Filed: May 19, 2020

(65) Prior Publication Data

US 2020/0277989 A1 Sep. 3, 2020

Related U.S. Application Data

(62) Division of application No. 15/558,681, filed as application No. PCT/JP2016/056931 on Mar. 7, 2016, now Pat. No. 10,697,496.

(30) Foreign Application Priority Data

Mar. 17, 2015 (JP) ................. 2015-053300
Mar. 17, 2015 (JP) ................. 2015-053307
Mar. 17, 2015 (JP) ................. 2015-053308

(51) Int. Cl.
*F16C 33/14* (2006.01)
*B22F 3/24* (2006.01)
(Continued)

(52) U.S. Cl.
CPC .............. *F16C 33/145* (2013.01); *B22F 3/24* (2013.01); *B22F 5/106* (2013.01); *F16C 33/104* (2013.01); *F16C 33/128* (2013.01); *B22F 1/068* (2022.01); *B22F 2301/10* (2013.01); *B22F 2301/35* (2013.01); *B22F 2998/10* (2013.01);
(Continued)

(58) Field of Classification Search
CPC ..... F16C 33/145; F16C 33/128; F16C 33/104
See application file for complete search history.

(56) References Cited

U.S. PATENT DOCUMENTS

| 6,023,114 A | 2/2000 | Mori |
| 6,511,225 B2 | 1/2003 | Tasch |
(Continued)

FOREIGN PATENT DOCUMENTS

| JP | 55-134108 | 10/1980 |
| JP | 03-073721 | 7/1991 |
(Continued)

OTHER PUBLICATIONS

International Search Report dated May 17, 2016 in International (PCT) Application No. PCT/JP2016/056931.
(Continued)

*Primary Examiner* — Sarang Afzali
(74) *Attorney, Agent, or Firm* — Wenderoth, Lind & Ponack, L.L.P.

(57) ABSTRACT

A sintered bearing includes, on an inner peripheral surface, a cylindrical portion and a one-side increased-diameter portion, which are provided so as to be continuous in the axial direction. An end portion of one side in the axial direction of the cylindrical portion and an end portion of another side in the axial direction of the increased-diameter portion coincide, and the cylindrical portion and the increased-diameter portion are molded by performing sizing on a sintered compact having a tubular shape, which is introduced into a die.

1 Claim, 17 Drawing Sheets

(51) Int. Cl.
  *B22F 5/10* (2006.01)
  *F16C 33/10* (2006.01)
  *F16C 33/12* (2006.01)
  *C22C 5/08* (2006.01)
  *F16C 17/02* (2006.01)
  *B22F 1/068* (2022.01)

(52) U.S. Cl.
  CPC ............ *B22F 2999/00* (2013.01); *C22C 5/08* (2013.01); *F16C 17/02* (2013.01); *Y10T 29/49673* (2015.01)

(56) References Cited

U.S. PATENT DOCUMENTS

| | | |
|---|---|---|
| 8,360,648 B2 | 1/2013 | Maruyama |
| 2001/0055431 A1 | 12/2001 | Tasch et al. |
| 2007/0041672 A1 | 2/2007 | Maruyama et al. |

FOREIGN PATENT DOCUMENTS

| | | |
|---|---|---|
| JP | 04-307112 | 10/1992 |
| JP | 07-233817 | 9/1995 |
| JP | 08-019941 | 3/1996 |
| JP | 9-264326 | 10/1997 |
| JP | 10-85995 | 4/1998 |
| JP | 11-236604 | 8/1999 |
| JP | 2001-279301 | 10/2001 |
| JP | 2002-61649 | 2/2002 |
| JP | 2004-308683 | 11/2004 |
| JP | 2004-316924 | 11/2004 |
| JP | 2005-009573 | 1/2005 |

OTHER PUBLICATIONS

International Preliminary Report on Patentability and Written Opinion of the International Searching Authority dated Sep. 19, 2017 in International (PCT) Application No. PCT/JP2016/056931.

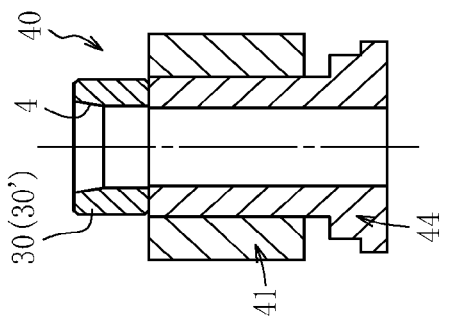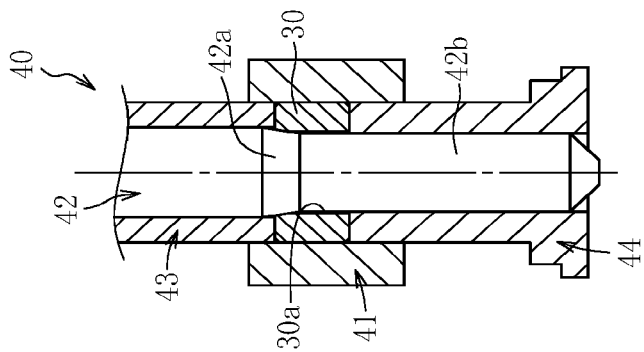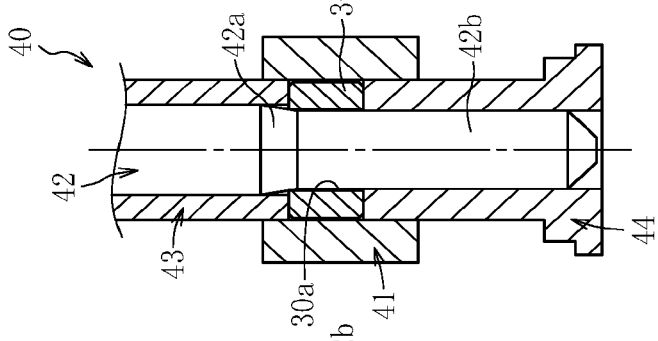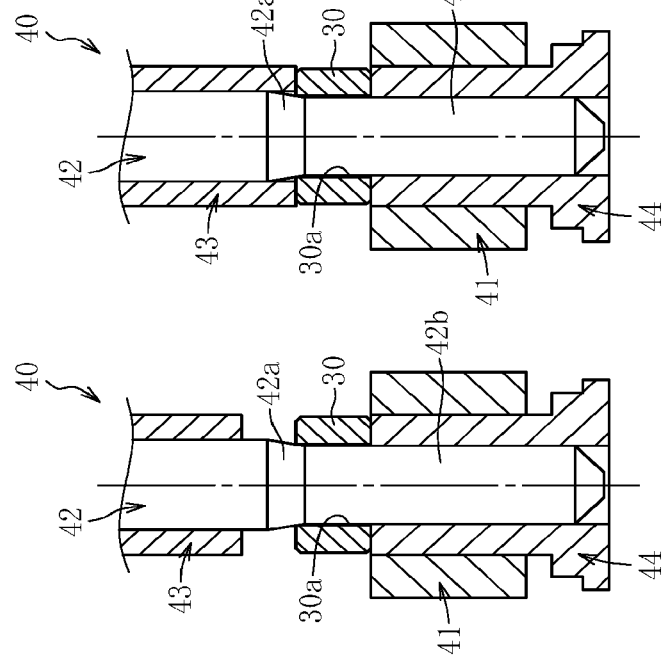

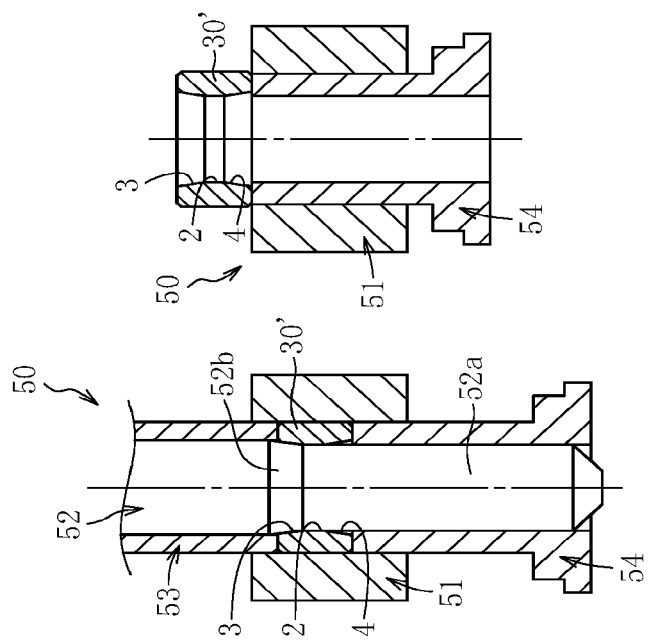
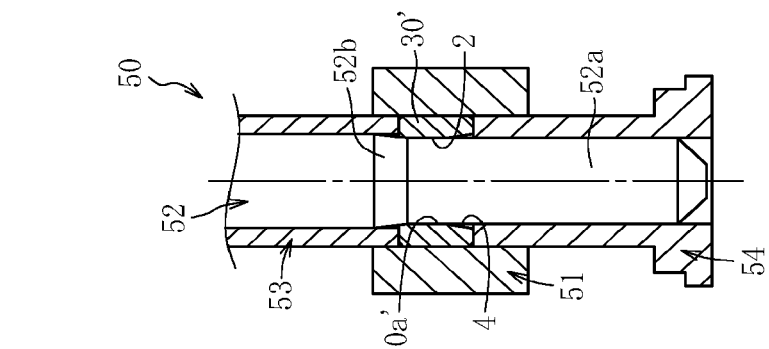
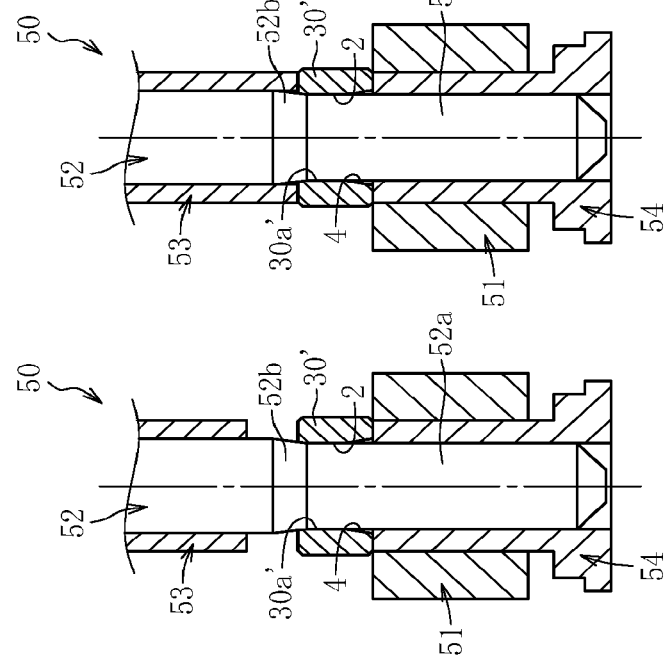

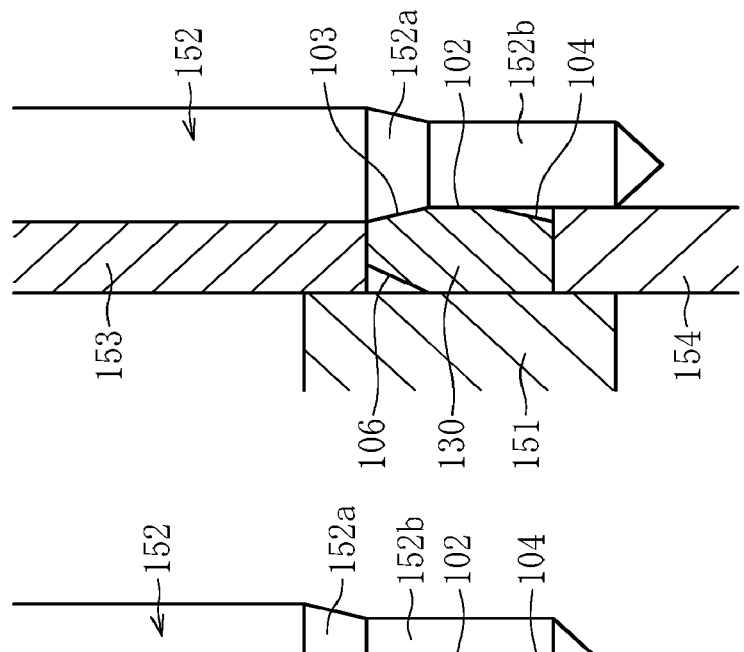
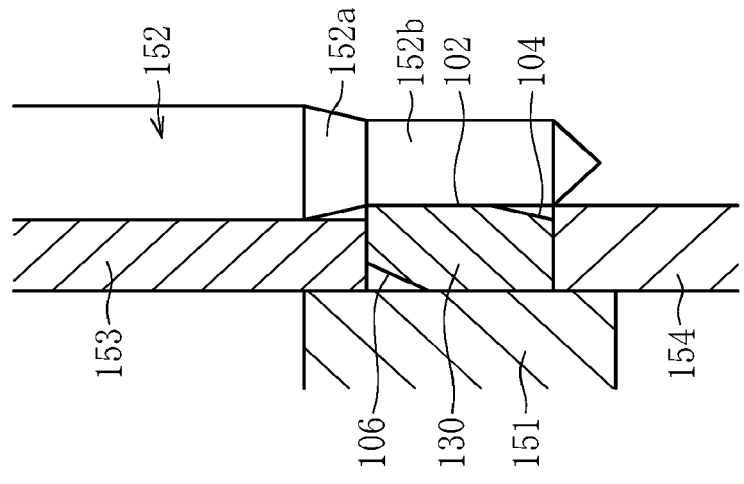
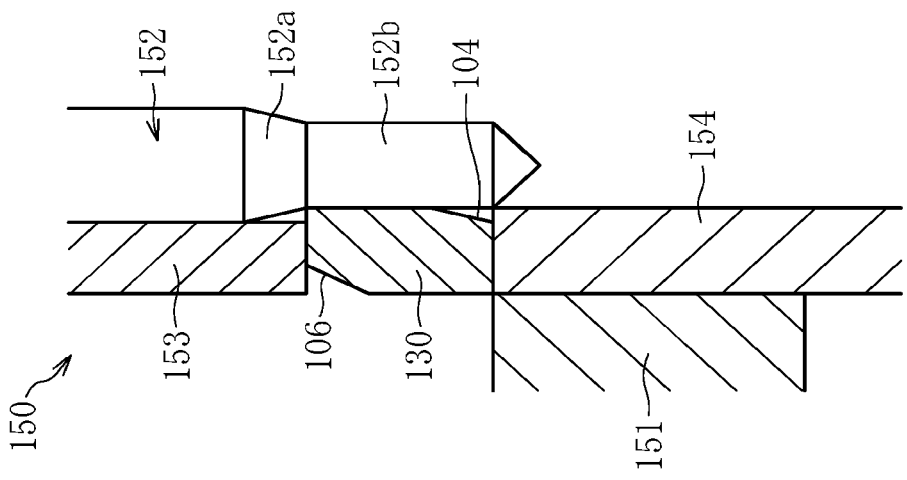

SINTERED BEARING

TECHNICAL FIELD

The present invention relates to a method of manufacturing a sintered bearing and a sintered bearing.

BACKGROUND ART

A sintered bearing is generally used under a state in which inner pores thereof are impregnated with a lubricating oil. In this case, along with rotation relative to a shaft inserted into an inner periphery, the lubricating oil contained in the inner pores seeps out onto a sliding portion with the shaft. Then, the seeping lubricating oil forms an oil film, and the shaft is supported by the oil film so as to be freely rotatable relative to the sintered bearing. The sintered bearing (oil-impregnated sintered bearing) described above is assembled into, for example, a power transmission mechanism for a power window, which is configured to open and close window glass of a vehicle for use.

The power transmission mechanism for a power window mainly includes, for example, as illustrated in FIG. 24, a motor 261, a shaft 262 to be rotated by the motor 261, a worm gear 263 provided on the shaft 262, and a wheel gear 264 configured to mesh with the worm gear 263. Rotational power input from the motor 261 to the shaft 262 is transmitted to the wheel gear 264 through intermediation of the worm gear 263 under a speed-reduced state, and is further transmitted to a window glass opening and closing mechanism (not shown). The shaft 262 is supported by a plurality of bearings 265 arranged in a separated manner in an axial direction of the shaft 262 so as to be freely rotatable with respect to a housing 266. As each of the above-mentioned bearings 265 configured to support the shaft 262, the sintered bearing (oil-impregnated sintered bearing) is suitably used.

In the power transmission mechanism illustrated in FIG. 24, a load F in a direction orthogonal to an axis of the shaft 262 is applied to a part of the shaft 262 (part thereof in a longitudinal direction of the shaft 262) as a result of meshing between the worm gear 263 and the wheel gear 264. Therefore, the shaft 262 is warped. In this case, the part of the shaft 262 is rotated relative to the bearings 265 under an inclined state with respect to an axis line of the sintered bearings 265. Therefore, an outer peripheral surface of the shaft 262 locally slides on inner peripheral surfaces (bearing surfaces) of the bearings 265. As a result, there is a fear of occurrence of disadvantages such as wear of the bearing surfaces and generation of abnormal noise.

In view of the disadvantages, in the power transmission mechanism described above, there has been examined use of sintered bearings disclosed in, for example, Patent Literature 1 and Patent Literature 2, specifically, a sintered bearing including, on an inner peripheral surface, a cylindrical portion and an increased-diameter portion (one-side increased-diameter portion) which is provided so as to be adjacent to one axial side of the cylindrical portion and has a diameter gradually increased toward the one axial side. Specifically, when the above-mentioned sintered bearing is assembled into the power transmission mechanism so that the increased-diameter portion is arranged on a side closer to the worm gear 263, the outer peripheral surface of the shaft 262 can be supported by the increased-diameter portion of the sintered bearing even in a case where the part of the shaft 262 is warped. Therefore, stress concentration on the inner peripheral surface of the sintered bearing can be relaxed. Thus, occurrence of the above-mentioned various types of disadvantages can be prevented as much as possible.

The above-mentioned sintered bearing including the cylindrical portion and the increased-diameter portion on the inner peripheral surface can be obtained by performing sizing on an inner peripheral surface of a cylindrical sintered compact, for example, as disclosed in Patent Literature 3. Specifically, first, a cylindrical portion molding surface formed on a first core rod, which corresponds to a shape of the cylindrical portion, is pressed against the inner peripheral surface of the sintered compact (region of the inner peripheral surface, on which the cylindrical portion is to be molded), thereby molding the cylindrical portion. Thereafter, an increased-diameter portion molding surface formed on a second core rod, which corresponds to a shape of the increased-diameter portion, is pressed against, that is, is gradually pushed into a region of the inner peripheral surface of the sintered compact, on which the increased-diameter portion is to be molded, thereby molding the increased-diameter portion.

Further, in the sintered bearing disclosed in Patent Literature 2, a density of the increased-diameter portion is increased to reduce a surface opening ratio. In this manner, penetration of the lubricating oil from the increased-diameter portion into the inner pores is suppressed to enhance a function of supporting the shaft. A density of the inner peripheral surface (including the cylindrical portion and the increased-diameter portion) of the sintered bearing is adjusted by increasing or decreasing an amount of compression in a sizing step.

CITATION LIST

Patent Literature 1: JP 03-73721 U
Patent Literature 2: JP 08-19941 B
Patent Literature 3: JP 2004-308683 A

SUMMARY OF INVENTION

Technical Problem

As described above, in order to support the shaft 262 with high accuracy, which is sometimes rotated relative to the sintered bearings under a state in which the part of the shaft 262 in the longitudinal direction is inclined with respect to the axis line, each of the cylindrical portion and the increased-diameter portion formed on the inner peripheral surface of each of the above-mentioned sintered bearings is required to be formed with high accuracy. In addition, a boundary portion between the cylindrical portion and the increased-diameter portion is also required to be formed with high accuracy. Further, the sintered bearing is a mass-produced part, and thus is desired to be manufacturable at cost as low as possible.

When the cylindrical portion and the increased-diameter portion are individually molded as in the case of Patent Literature 3, however, a thickness of the sintered compact is shifted toward an axial center of the sintered compact, that is, shifted forward in a direction of movement of the second core rod, in particular, along with gradual pushing of the increased-diameter portion molding surface of the second core rod against the inner peripheral surface of the sintered compact. Finally, in the vicinity of the boundary portion of the cylindrical portion with the increased-diameter portion, a projecting raised portion is liable to be formed. In this case, there are brought about disadvantages. For example, a position of the boundary portion between the two portions is not fixed and varied between individuals, or a deviation of circularity (cylindricity) of the cylindrical portion occurs. As a result, supporting accuracy for the shaft 262 is decreased. Therefore, additional processing for finishing the inner peripheral surface of the sintered compact with high accuracy is required so that the shaft 262 can be supported with high accuracy. Thus, manufacturing cost is increased.

Further, by only increasing the density of the increased-diameter portion of the inner peripheral surface as disclosed in Patent Literature 2, rotation accuracy of the shaft is not sufficiently increased in some cases. Such a problem may similarly occur not only when the shaft is rotated with the sintered bearing being fixed but also when the sintered bearing is rotated with the shaft being fixed.

In view of the circumstances described above, a first object of the present invention is to provide a sintered bearing capable of supporting a shaft which may sometimes be rotated relative to the sintered bearing under an inclined state with respect to an axis line of the sintered bearing with high accuracy over a long period of time at low cost.

Further, a second object of the present invention is to sufficiently increase relative rotation accuracy of the shaft to be inserted into an inner periphery of the sintered bearing.

Solution to Problem

According to a first invention devised so as to solve the first problem described above, there is provided a method of manufacturing a sintered bearing, the sintered bearing comprising, on an inner peripheral surface of the sintered bearing, a cylindrical portion having a constant diameter and an increased-diameter portion having a diameter gradually increased toward one side of the cylindrical portion in an axial direction of the sintered bearing, which is arranged so as to be adjacent to the cylindrical portion on the one side in the axial direction, the method comprising, when sizing is performed on a sintered compact having a tubular shape, molding the cylindrical portion and the increased-diameter portion on an inner peripheral surface of the sintered compact by press-fitting a cylindrical portion molding surface of a sizing core comprising the cylindrical portion molding surface corresponding to a shape of the cylindrical portion and an increased-diameter portion molding surface corresponding to a shape of the increased-diameter portion, which are provided so as to be continuous in the axial direction, into an inner peripheral surface of the sintered compact from the one side in the axial direction, and then by pressing the increased-diameter portion molding surface of the sizing core against the inner peripheral surface of the sintered compact under a state in which an outer peripheral surface of the sintered compact is retained by a die having a tubular shape.

According to the manufacturing method described above, the cylindrical portion and the increased-diameter portion to be formed on the inner peripheral surface of the sintered bearing are molded by the sizing core comprising the cylindrical portion molding surface and the increased-diameter portion molding surface corresponding to shapes of the cylindrical portion and the increased-diameter portion, which are provided so as to be continuous in the axial direction. In addition, the increased-diameter portion is molded under a state in which the outer peripheral surface of the sintered compact is retained by the die and the inner peripheral surface (region of the inner peripheral surface, on which the cylindrical portion is to be molded) of the sintered compact is retained by the cylindrical portion molding surface of the sizing core. In this case, even when the thickness is shifted in an inner peripheral portion of the sintered compact along with pushing (pressing) of the increased-diameter portion molding surface of the sizing core, the thickness is not shifted forward (side closer to the cylindrical portion) in a direction of movement of the sizing core but is mainly shifted toward a center of the sintered compact in a radial direction (thickness direction) of the sintered compact. Therefore, the cylindrical portion, the increased-diameter portion, and further a boundary portion between the two portions, specifically, the entire partial region of the inner peripheral surface of the sintered compact, which relates to support of the shaft, can be finished into target shapes in a single step. Therefore, regardless of whether or not the shaft is inclined with respect to the axis line, the sintered bearing capable of supporting the shaft with high accuracy over a long period of time can be obtained at low cost.

In the configuration described above, it is preferred that the increased-diameter portion molding surface of the sizing core be pressed against a region of the inner peripheral surface of the sintered compact, on which the cylindrical portion molding surface of the sizing core slides along with the press-fit of the cylindrical portion molding surface. In this manner, the increased-diameter portion is press-molded (compression-molded) on a region of the inner peripheral surface of the sintered compact, which has been subjected to pore-filling along with the sliding on the sizing core. Thus, the sintered bearing in which a surface opening ratio of the increased-diameter portion becomes smaller than a surface opening ratio of the cylindrical portion can be easily obtained. In this case, a pressure (stiffness) of an oil film formed between the increased-diameter portion and the outer peripheral surface of the shaft to be supported can be increased. Thus, the shaft which is rotated relative to the sintered bearing under an inclined state with respect to the axis line can be supported with high accuracy.

The outer peripheral surface of the sintered compact is retained by the die by, for example, press-fitting the cylindrical portion molding surface of the sizing core into the inner peripheral surface of the sintered compact, and then by press-fitting the outer peripheral surface of the sintered compact into the die. In this manner, the sintered bearing comprising the outer peripheral surface with a reduced surface opening ratio can be easily obtained. Other than by the procedure described above, the outer peripheral surface of the sintered compact can be retained by the die by, for example, press-fitting the sintered compact into the die simultaneously with the press-fit of the cylindrical portion molding surface of the sizing core into the inner peripheral surface of the sintered compact.

The first problem described above can also be solved by a method of manufacturing a sintered bearing, the sintered bearing comprising, on an inner peripheral surface of the sintered bearing, a cylindrical portion having a constant diameter, a one-side increased-diameter portion having a diameter gradually increased toward one side of the cylindrical portion in an axial direction of the sintered bearing, which is arranged so as to be adjacent to the cylindrical portion on the one side in the axial direction, and an another-side increased-diameter portion having a diameter gradually increased toward another side of the cylindrical portion in the axial direction, which is arranged so as to be adjacent to the cylindrical portion on the another side in the axial direction, the method comprising, when sizing is performed on a sintered compact having a tubular shape: primary sizing for molding the another-side increased-diameter portion on an inner peripheral surface of the sintered compact by pressing an another-side increased-diameter portion molding surface of a first sizing core comprising the another-side increased-diameter portion molding surface corresponding to a shape of the another-side increased-diameter portion against the inner peripheral surface of the sintered compact under a state in which an outer peripheral surface of the sintered compact is retained by a first die having a tubular shape; and secondary sizing for molding the cylindrical portion and the one-side increased-diameter portion on the inner peripheral surface of the sintered compact by press-fitting a cylindrical portion molding surface of a second sizing core comprising the cylindrical portion molding surface corresponding to a shape of the cylindrical portion and a one-side increased-diameter portion molding surface corresponding to a shape of the one-side increased-diameter portion, which are provided so as to be continuous in the axial direction, into the inner peripheral surface of the sintered compact from the one side in the axial direction, and then by pressing the one-side increased-diameter portion molding surface of the second sizing core against the inner peripheral surface of the sintered compact under a state in which the outer peripheral surface of the sintered compact is retained by a second die having a tubular shape.

Specifically, when the secondary sizing is carried out in the mode described above, the cylindrical portion and the one-side increased-diameter portion, which are molded in the secondary sizing, and the boundary portion between the two portions can be finished into target shapes only by the secondary sizing.

In the secondary sizing, the one-side increased-diameter portion molding surface of the second sizing core may be pressed against a region of the inner peripheral surface of the sintered compact, on which the cylindrical portion molding surface of the second sizing core slides along with the press-fit of the cylindrical portion molding surface. In this manner, the one-side increased-diameter portion is press-molded in a pore-filled region of the inner peripheral surface of the sintered compact through sliding with the one-side increased-diameter portion molding surface of the second sizing core. Thus, the sintered bearing comprising the one-side increased-diameter portion having a surface opening ratio smaller than the surface opening ratio of the cylindrical portion can be easily obtained.

A region of the inner peripheral surface of the sintered compact, on which the cylindrical portion and the one-side increased-diameter portion are to be molded, and the first sizing core may be held in a non-contact state during execution of the primary sizing. In this manner, the surface opening ratio of the cylindrical portion and the surface opening ratio of the one-side increased-diameter portion, which are molded in the secondary sizing, can be prevented from becoming excessively small so as to prevent the amount of lubricating oil seeping out from surface openings of the cylindrical portion and the one-side increased-diameter portion from becoming excessively small as much as possible.

When a retention force of the first die for the outer peripheral surface of the sintered compact is set relatively small and a retention force of the second die for the outer peripheral surface of the sintered compact is set relatively large, the sintered bearing having a difference in surface opening ratio between the one-side increased-diameter portion and the another-side increased-diameter portion can be easily obtained.

As the sintered compact to be subjected to the sizing so as to obtain the sintered bearing comprising the cylindrical portion, the one-side increased-diameter portion, and the another-side increased-diameter portion on the inner peripheral surface, the sintered compact comprising a region of the inner peripheral surface, on which the cylindrical portion, the one-side increased-diameter portion, and the another-side increased-diameter portion are to be molded, formed as the cylindrical surface having a constant diameter may be used. The sintered compact comprising a region of the inner peripheral surface, on which the cylindrical portion and the one-side increased-diameter portion are to be molded, formed as the cylindrical surface having a constant diameter and a region of the inner peripheral surface, on which the another-side increased-diameter portion is to be molded, formed as a tapered surface having a diameter gradually increased toward the another side in the axial direction may be used.

Further, in order to solve the first problem described above, according one embodiment of the present application, there is provided a sintered bearing comprising, on an inner peripheral surface of the bearing, a cylindrical portion having a constant diameter and an increased-diameter portion having a diameter gradually increased toward one side of the cylindrical portion in an axial direction of the sintered bearing, which is arranged so as to be adjacent to the cylindrical portion on the one side in the axial direction, the cylindrical portion and the increased-diameter portion being molded by performing sizing on a sintered compact having a tubular shape, wherein the cylindrical portion comprises a surface molded by ironing with a sizing core, and wherein the increased-diameter portion comprises a surface compression-molded through ironing with the sizing core.

Further, in order to solve the first object described above, according one embodiment of the present application, there is provided a sintered bearing comprising, on an inner peripheral surface of the sintered bearing, a cylindrical portion having a constant diameter, a one-side increased-diameter portion having a diameter gradually increased toward one side of the cylindrical portion in an axial direction of the sintered bearing, which is arranged so as to be adjacent to the cylindrical portion on the one side in the axial direction, and an another-side increased-diameter portion having a diameter gradually increased toward another side of the cylindrical portion in the axial direction, which is arranged so as to be adjacent to the cylindrical portion on the another side in the axial direction, the cylindrical portion, the one-side increased-diameter portion, and the another-side increased-diameter portion being molded by performing sizing on a sintered compact having a tubular shape, wherein the another-side increased-diameter portion comprises a surface compression-molded without ironing with a sizing core, wherein the cylindrical portion comprises a surface molded by ironing with the sizing core, and wherein the one-side increased-diameter portion comprises a surface compression-molded through ironing with the sizing core.

According to a second invention devised so as to solve the second problem described above, there is provided a sintered bearing which is formed of a sintered compact having a tubular shape and includes inner pores impregnated with a lubricating oil. The sintered bearing is featured in comprising, on the inner peripheral surface, the cylindrical portion and the increased-diameter portion, which is provided adjacent to the cylindrical portion on the one side in the axial direction, has a diameter gradually increased toward the one side in the axial direction, and has a density higher than that of the cylindrical portion, and in comprising a high-density portion having a density higher than that of another region in an axial region of the increased-diameter portion of the outer peripheral surface.

As described above, when not only the density of the increased-diameter portion of the inner peripheral surface is increased to reduce the surface opening ratio but also when the density of the axial region of the increased-diameter portion of the sintered compact is increased from the outer peripheral side, the density of the sintered compact in the axial region of the increased-diameter portion is further increased. As a result, the lubricating oil is further less liable to be moved from the surface openings of the increased-diameter portion into an inside of the sintered compact. In this manner, a pressure of the oil film which is present between the increased-diameter portion and the shaft is further increased.

The high-density portion can be formed as a tapered surface having a diameter gradually increased toward the one side in the axial direction. Further, the outer peripheral surface of the sintered bearing can be formed as a straight cylindrical surface. Further, the increased-diameter portion can be formed as a molded surface compressed by the sizing.

The sintered bearing according to the second invention devised so as to solve the second problem described above may be manufactured by a method of manufacturing a sintered bearing, comprising, for example, a compression molding step of compression-molding raw material powder to obtain a green compact, a sintering step of sintering the green compact to obtain a sintered compact, a sizing step of compression-molding the sintered compact, and an oil-impregnating step of impregnating the inner pores of the sintered compact with the lubricating oil. In the sizing step, the cylindrical portion and the increased-diameter portion, which is provided so as to be adjacent to the one side of the cylindrical portion in the axial direction, has the diameter gradually increased toward the one side in the axial direction, and has the density higher than that of the cylindrical portion, are molded on the inner peripheral surface of the sintered compact, and the high-density portion having a density higher than that of another region is molded in the axial region of the increased-diameter portion on the outer peripheral surface of the sintered compact.

In this case, an outer peripheral surface of the green compact is molded into a straight cylindrical surface in the compression molding step, and the outer peripheral surface of the sintered compact is compressed in the sizing step. As a result, the high-density portion having a smaller diameter than that of another region can be molded. In this case, the sizing step may comprise a primary sizing step of molding the high-density portion on the outer peripheral surface of the sintered compact and a secondary sizing step of molding the cylindrical portion and the increased-diameter portion on the inner peripheral surface of the sintered compact.

In the above-mentioned configuration, the sintered compact comprising a large-diameter portion and a small-diameter portion formed on the outer peripheral surface may be obtained by forming the large-diameter portion and the small-diameter portion on the outer peripheral surface of the green compact in the compression molding step and sintering the green compact in the sintering step. Then, in the sizing step, the outer peripheral surface of the sintered compact may be molded into the straight cylindrical surface shape.

Advantageous Effects of Invention

As described above, according to the first invention, the sintered bearing capable of supporting the shaft with high accuracy over a long period of time regardless of whether the shaft is rotated relative to the sintered bearing under a state of being parallel to the axis line or is rotated relative to the sintered bearing under an inclined state with respect to the axis line can be obtained at low cost.

Further, according to the second invention, even when the shaft is inclined with respect to an axial center of the sintered bearing, the oil film formed between the increased-diameter portion of the inner peripheral surface of the sintered bearing and the shaft is maintained at a high pressure. Therefore, a function for supporting the shaft, which is provided by the increased-diameter portion of the sintered bearing, is enhanced. Therefore, relative rotation accuracy of the shaft can be increased.

BRIEF DESCRIPTION OF DRAWINGS

FIG. 7A is a schematic sectional view for illustrating a stage immediately after start of primary sizing.

FIG. 7B is a schematic sectional view for illustrating a stage during the primary sizing.

FIG. 7C is a schematic sectional view for illustrating a stage during the primary sizing.

FIG. 7D is a schematic sectional view for illustrating a stage during the primary sizing.

FIG. 7E is a schematic sectional view for illustrating a completion stage of the primary sizing.

FIG. 9A is a schematic sectional view for illustrating a stage immediately after start of secondary sizing.

FIG. 9B is a schematic sectional view for illustrating a stage during the secondary sizing.

FIG. 9C is a schematic sectional view for illustrating a stage during the secondary sizing.

FIG. 9D is a schematic sectional view for illustrating a stage during the secondary sizing.

FIG. 9E is a schematic sectional view for illustrating a completion stage of the secondary sizing.

FIG. 17A is a sectional view for illustrating an initial stage of a secondary sizing step.

FIG. 17B is a sectional view for illustrating a stage during the secondary sizing step.

FIG. 17C is a sectional view for illustrating a stage during the secondary sizing step.

DESCRIPTION OF EMBODIMENTS

Now, embodiments of the present invention are described with reference to the drawings.

Figure 1:
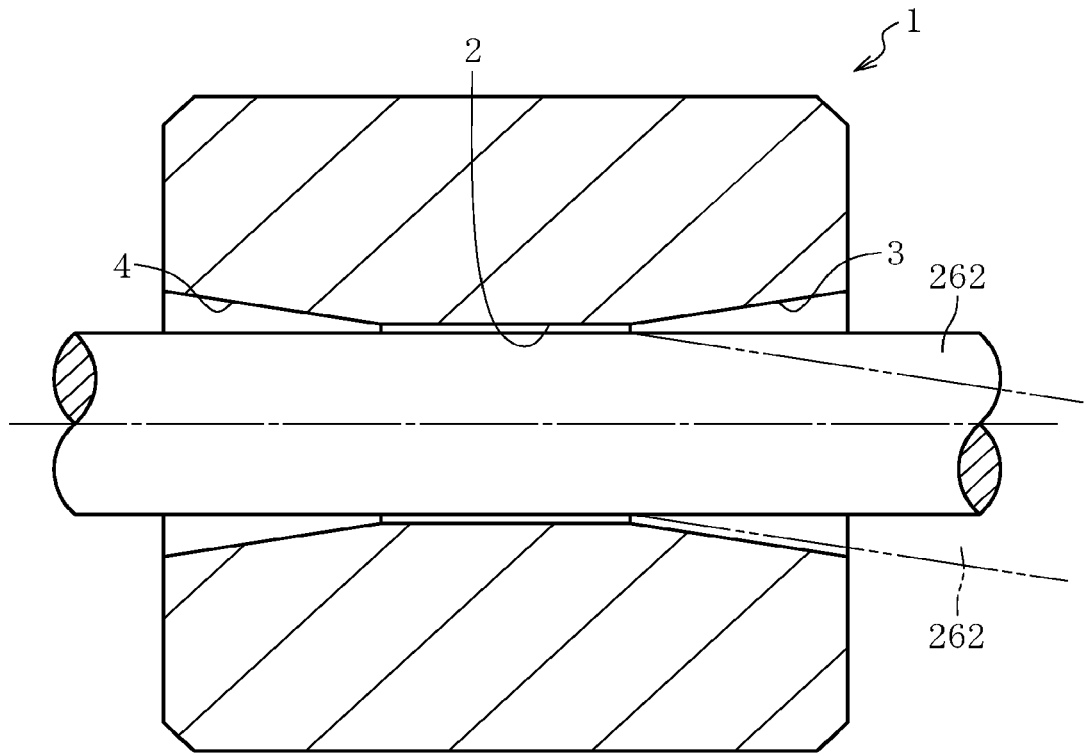
FIG. 1 is a schematic sectional view of a sintered bearing according to one embodiment of a first invention.

In FIG. 1, a sintered bearing 1 according to one embodiment of a first invention of the present application is illustrated. The sintered bearing 1 is, for example, a bearing used to support a shaft 262 in a power transmission mechanism for a power window illustrated in FIG. 24, specifically, is used as each of a pair of bearings 265 and 265 configured to support portions of the shaft 262, which are positioned on both axial sides of a worm gear 263. In the following description of the sintered bearing 1, a side relatively closer to the worm gear 263 in an axial direction of the shaft 262 is referred to as "one axial side", and a side opposite thereto is referred to as "another axial side".

The sintered bearing 1 is formed of a sintered compact having a cylindrical shape and is used under a state in which inner pores are impregnated with a lubricating oil. As the lubricating oil, for example, ester-based lubricating oils are used. Among others, an ester-based lubricating oil having a kinematic viscosity equal to or larger than 30 mm$^2$/sec and equal to or smaller than 200 mm$^2$/sec is preferably used. The sintered compact that forms the sintered bearing 1 comprises, for example, a copper-based sintered compact, an iron-based sintered compact, or a copper-iron based sintered compact. In this embodiment, a copper-iron based sintered compact containing copper and iron as main components is used.

The sintered bearing 1 comprises, on an inner peripheral surface, a cylindrical portion 2, a one-side increased-diameter portion 3 arranged on one axial side of the cylindrical portion 2 (right side in FIG. 1) so as to be adjacent thereto, which has a diameter gradually increased toward the one axial side, and an another-side increased-diameter portion 4 arranged on another axial side of the cylindrical portion 2 (left side in FIG. 1) so as to be adjacent thereto, which has a diameter gradually increased toward the another axial side. When the sintered bearing 1 is used in the power transmission mechanism for a power window illustrated in FIG. 24, the cylindrical portion 2 functions as a bearing surface configured to support the shaft 262 (see the solid line in FIG. 1) which is rotated under a state without warp, that is, a state of being parallel to an axis line of the sintered bearing 1, whereas the one-side increased-diameter portion 3 functions as a bearing surface configured to support the shaft 262 (see the long dashed double-short dashed line in FIG. 1) which is rotated under a warped state, that is, an inclined state with respect to the axis line as a result of a force F (see FIG. 24) received by the worm gear 263 from the worm wheel 264. On the other hand, the another-side increased-diameter portion 4 does not function as a bearing surface regardless of whether or not the shaft 262 is warped. In short, the shaft 262 does not slide on the another-side increased-diameter portion 4 of the sintered bearing 1.

In this embodiment, the one-side increased-diameter portion 3 and the another-side increased-diameter portion 4 are inclined at the same angle with respect to the axis line. An inclination angle is set to, for example, from 0.5° to 3°, preferably from about 1° to about 2°. The inclination angles of both of the increased-diameter portions 3 and 4 are illustrated in an exaggerated manner in FIG. 1 for the purpose of easy understanding.

The cylindrical portion 2, the one-side increased-diameter portion 3, and the another-side increased-diameter portion 4, which are formed on the inner peripheral surface of the sintered bearing 1, have different surface opening ratios from each other. In this case, a surface opening ratio (B) of the one-side increased-diameter portion 3 is smaller than a surface opening ratio (A) of the cylindrical portion 2 (B<A), and the surface opening ratio (A) of the cylindrical portion 2 is smaller than a surface opening ratio (C) of the another-side increased-diameter portion 4 (A<C). Specifically, the surface opening ratios A to C of the respective portions 2 to 4 formed on the inner peripheral surface of the sintered bearing 1 have a relationship: C>A>B. Further, an outer peripheral surface of the sintered bearing 1 is formed as a cylindrical surface having a constant diameter. A surface opening ratio of the outer peripheral surface is comparable with the surface opening ratio (A) of the cylindrical portion 2. The cylindrical portion 2, the one-side increased-diameter portion 3, and the another-side increased-diameter portion 4, which are formed on the inner peripheral surface of the sintered bearing 1, and the outer peripheral surface of the sintered bearing 1 are all finished to have predetermined shapes and predetermined surface opening ratios by performing sizing on a tubular sintered compact although details thereof are described later.

In the configuration described above, when a motor 261 (see FIG. 24) is driven to rotate the shaft 262, along with the rotation, the lubricating oil contained in the inner pores of the sintered bearing 1 seeps out into a bearing clearance between the inner peripheral surface of the sintered bearing 1 and an outer peripheral surface of the shaft 262. Under a state in which the warp of the shaft 262 is small, an oil film is formed between the cylindrical portion 2 of the sintered bearing 1 and the outer peripheral surface of the shaft 262. Through the oil film, the shaft 262 is supported so as to be freely rotatable. Meanwhile, when the warp of the shaft 262 becomes large, the shaft 262 is supported so as to be freely rotatable through an oil film formed between the one-side increased-diameter portion 3 of the sintered bearing 1 and the outer peripheral surface of the shaft 262.

Further, a seal portion (tapered seal portion) capable of keeping an oil surface of the lubricating oil can be formed between the another-side increased-diameter portion 4 of the sintered bearing 1 and the outer peripheral surface of the shaft 262, which is opposed thereto. Therefore, the lubricating oil which is present between the inner peripheral surface of the sintered bearing 1 and the outer peripheral surface of the shaft 262 can be effectively prevented from seeping out to an outside of the bearing through an opening portion of the sintered bearing 1 on the another axial side.

Further, as described above, the surface opening ratio (C) of the another-side increased-diameter portion 4 is larger than the surface opening ratio (A) of the cylindrical portion 2 and the surface opening ratio (B) of the one-side increased-diameter portion 3. Thus, during the rotation of the shaft 262, the lubricating oil which is present in a region facing the another-side increased-diameter portion 4 can be drawn into the inner pores of the sintered bearing 1 through surface openings of the another-side increased-diameter portion 4. The lubricating oil drawn into the inner pores seeps out again onto a sliding portion (bearing clearance) with the shaft 262 through the surface openings of the cylindrical portion 2 and the one-side increased-diameter portion 3 during the rotation of the shaft 262. In this manner, the lubricating oil can be moved (caused to flow and circulate) between the inner pores and the bearing clearance in the sintered bearing 1 of this embodiment. Therefore, a change in characteristics of the lubricating oil can be prevented as much as possible, and hence the shaft 262 can be stably supported over a long period of time.

The sintered bearing 1 having the configuration described above is manufactured through a mixing step, a compression molding step, a sintering step, a sizing step, and an oil impregnating step in the stated order. Each of the steps is specifically described below.

[Mixing Step]

The mixing step is a step of obtaining molding powder (raw material powder) for a green compact by mixing a plurality of kinds of powders. In this embodiment, main raw material powder, low-melting point metal powder, and solid lubricant powder are mixed to obtain the raw material powder. Various types of molding aids, for example, a lubricant for improvement of mold releasability is added to the raw material powder as needed. The raw material powder described below is merely an example, and types and a blending ratio of powder to be contained in the raw material powder are appropriately changed in accordance with characteristics required for the sintered bearing 1 and the like.

Figure 2:
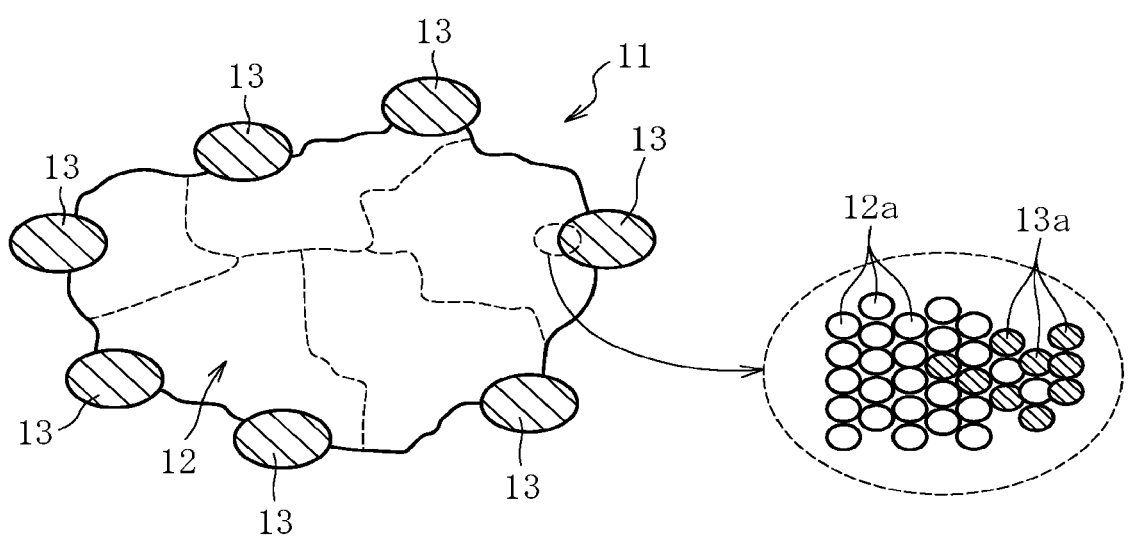
FIG. 2 is a view for schematically illustrating partially diffusion-alloyed powder.

The main raw material powder is metal powder containing copper and iron. In this embodiment, a mixture of partially diffusion-alloyed powder and flat copper powder is used as the main raw material powder. As illustrated in FIG. 2, for example, Fe—Cu partially diffusion-alloyed powder in which a number of grains of copper powder 13 are partially diffused on the surface of iron powder 12 is used as partially diffusion-alloyed powder 11. A diffusion portion of the partially diffusion-alloyed powder 11 forms an Fe—Cu alloy, and the alloy portion has a crystalline structure in which iron atoms $12a$ and copper atoms $13a$ are bonded to each other and arranged (see an enlarged portion of FIG. 2).

As the iron powder 12 constituting the partially diffusion-alloyed powder 11, reduced iron powder, atomized iron powder, or other known iron powders may be used. In this embodiment, the reduced iron powder, which is sponge-like shape (porous shape) having inner pores and is excellent in the oil-containing property, is used. Further, as the copper powder 13, for example, electrolytic copper powder, atomized copper powder, or the like may be used. In this embodiment, the atomized copper powder, which has a large number of irregularities on its surface, has a substantially spherical but irregular shape in the entirety of its grain, and is excellent in moldability, is used. As the copper powder 13, copper powder having a grain diameter smaller than that of the iron powder 12 is used. The ratio of Cu in the partially diffusion-alloyed powder 11 is, for example, from 10 wt % to 30 wt %, preferably from 22 wt % to 26 wt %.

Figure 3:
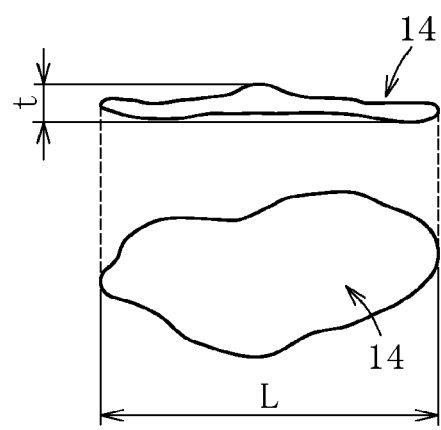
FIG. 3 is a view for illustrating flat copper powder with a side view thereof on an upper side and a plan view thereof on a lower side.

The flat copper powder is obtained by flattening raw material copper powder containing water-atomized powder and the like through stamping. As illustrated in FIG. 3, as flat copper powder 14, there is mainly used flat copper powder having a grain length L of from 20 µm to 80 µm and a grain thickness t of from 0.5 µm to 1.5 µm (aspect ratio L/t=13.3 to 160). The "length" and the "thickness" herein refer to the maximum geometric dimensions of individual grains of the flat copper powder 14. The apparent density of the flat copper powder 14 is set equal to or smaller than 1.0 g/cm$^3$. In order to increase an adhesive property to a molding surface (cavity defining surface) of a mold, it is preferred to cause a fluid lubricant to adhere to the flat copper powder 14 in advance. The fluid lubricant only needs to be caused to adhere to the flat copper powder 14 before loading the raw material powder into the mold. Specifically, the fluid lubricant is caused to adhere to the raw material copper powder preferably before mixing the flat copper powder 14 with the other powders, more preferably in a stage of stamping the raw material copper powder. As the fluid lubricant, a fatty acid, in particular, a linear saturated fatty acid, specifically, stearic acid can be used.

As low-melting point metal powder 15 (see FIG. 5), metal powder having a lower melting point than copper, for example, powder of tin, zinc, or phosphorus is used. Among others, it is preferred to use tin that is less evaporated at the time of sintering. As the low-melting point metal powder 15, low-melting point metal powder having a grain diameter smaller than that of the partially diffusion-alloyed powder 11 is used. Those low-melting point metal powders have high wettability to copper. Therefore, when the sintering step described later is carried out, the low-melting point metal (tin in this embodiment) melts first to wet the surface of the copper powder, and then diffuses into copper to allow copper to melt. Liquid phase sintering is progressed with an alloy of the molten copper and the low-melting point metal, with the result that a bonding strength between iron grains, a bonding strength between iron grains and copper grains, and a bonding strength between copper grains are increased.

The solid lubricant powder is added for the main purpose of reducing frictional force between the shaft 262 and the sintered bearing 1, and graphite powder is used as an example. As the graphite powder, it is preferred to use flake graphite powder having satisfactory adhesiveness to the flat copper powder 14. As the solid lubricant powder, for example, molybdenum disulfide powder may be used other than the graphite powder. When the solid lubricant powder is added, a frictional force between the grains forming the raw material powder and a frictional force between the raw material powder and the mold are reduced. Thus, moldability of the green compact is improved.

For the above-mentioned raw material powder, the blend ratio of respective powders may be, for example, the Fe—Cu partially diffusion-alloyed powder 11 at from 75 wt % to 90 wt %, the flat copper powder 14 at from 8 wt % to 20 wt %, tin powder as the low-melting point metal powder 15 at from 0.8 wt % to 6.0 wt %, and the graphite powder at from 0.5 wt % to 2.0 wt %.

[Compression Molding Step]

Figure 4:
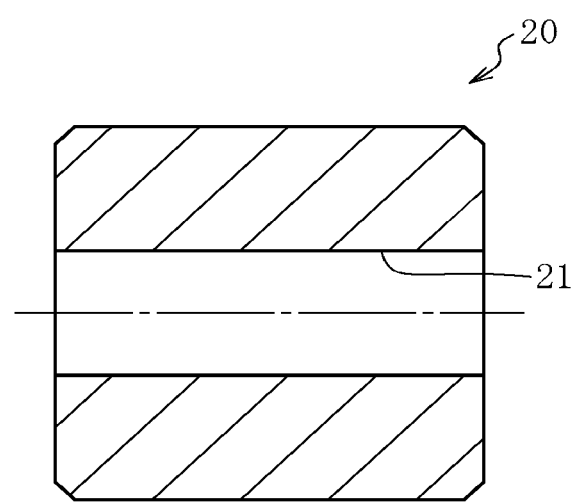
FIG. 4 is a schematic sectional view of a green compact.

In the compression molding step, the raw material powder obtained in the above-mentioned mixing step is loaded into the cavity of the mold and then is compressed, thereby obtaining a green compact 20 illustrated in FIG. 4. In this embodiment, an inner peripheral surface of the green compact 20 is formed as a cylindrical surface having a constant diameter. An outer peripheral surface of the green compact 20 is formed as a cylindrical surface having a constant diameter except for chamfered portions formed on outer peripheral edge portions at both ends of the green compact 20.

Figure 5:
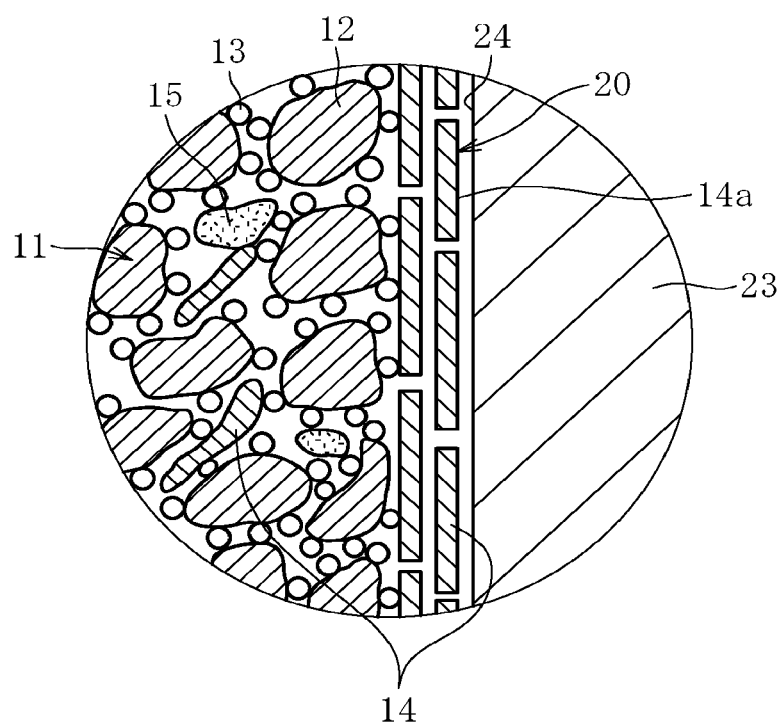
FIG. 5 is a partially enlarged sectional view of a mold during molding of the green compact.

Among the metal powders contained in the raw material powder used in this embodiment, the flat copper powder 14 has the smallest apparent density. Further, the grain of the flat copper powder 14 has a foil-like shape as illustrated in FIG. 3, and its wider surface has a large area per unit weight. Therefore, the flat copper powder 14 is affected by an adhesion force that is generated due to the fluid lubricant adhering onto the surface of the flat copper powder, and further by the Coulomb force or the like to adhere to the molding surface of the mold after loading the raw material powder into the cavity of the mold. More specifically, the flat copper powder 14 is caused to adhere to the entire region of a molding surface 24 of a mold 23 with a wider surface 14a thereof opposed to the molding surface 24 under a superimposed state in a layered manner, as illustrated in FIG. 5. On the other hand, in an inner region of a layered structure of the flat copper powder 14 (region close to the center of the cavity), the partially diffusion-alloyed powder 11, the flat copper powder 14, the low-melting point metal powder (tin powder) 15, and graphite powder (not shown) are brought into a state of being dispersed uniformly as a whole. In the green compact 20 obtained after the molding, the distribution state of the powders as described above is maintained substantially as it is.

[Sintering Step]

In the sintering step, the green compact 20 is sintered to obtain a sintered compact 30 (see FIG. 6) in which adjacent metal powders (grains) are bonded to each other. In this embodiment, sintering conditions are set so that the inner peripheral surface of the sintered bearing 1 obtained by sizing the sintered compact 30 can be formed as a copper-rich surface in which a copper structure has the largest area (largest copper area ratio) and an iron structure of the sintered compact 30 becomes a two-phase structure containing a ferrite phase and a pearlite phase. When the bearing surface is formed as the copper-rich surface as described above, the sintered bearing 1 excellent in slidability with the shaft 262 can be obtained. Further, when the iron structure is formed of the two-phase structure containing the ferrite phase and the pearlite phase, the hard pearlite phase contributes to improvement in wear resistance of the bearing surface of the sintered bearing 1. As a result, a durability life of the sintered bearing 1 can be prolonged. When a ratio of the pearlite phase to the iron structure is excessively high, however, aggressiveness to the shaft 262 due to the pearlite phase is increased, and hence the shaft 262 is liable to wear. From such viewpoint, it is preferred that the pearlite phase be set to such an extent that the pearlite phase is present in a scattered manner at a grain boundary of the ferrite phase.

When a sintering temperature (furnace atmosphere temperature in a sintering furnace) is set to a temperature, for example, exceeding 900° C., carbon in the graphite powder contained in the green compact 20 reacts with iron, resulting in formation of a larger amount of the pearlite phase than needed. Still more, when the sintering temperature is set to a high temperature (approximately 1,100° C. or higher) generally adopted to obtain a copper-iron based sintered compact, the flat copper powder 14 which is present in a surface layer portion of the green compact 20 melts along with the sintering to draw copper to inside of the green compact 20 (sintered compact 30). Thus, it becomes difficult to obtain the copper-rich bearing surface. Meanwhile, in this embodiment, the low-melting point metal powder 15 contained in the green compact 20 is molten to progress liquid-phase sintering to ensure the bonding strength between the grains, as described above. Therefore, a lower limit of the sintering temperature is required to be set to a temperature higher than a melting point of the low-melting point metal.

In view of the above-mentioned facts, in this embodiment, the green compact 20 is sintered at the sintering temperature set from about 820° C. to about 900° C. in a gas (for example, a natural gas or an RX gas) atmosphere containing carbon as a furnace atmosphere. When the green compact 20 is sintered under the sintering conditions described above, first, the sintered compact 30 (sintered bearing 1) having the copper-rich bearing surface can be obtained based on the sintering temperature sufficiently lower than a melting point of copper. Further, the sintered compact 30 having the iron structure containing an appropriate amount of the pearlite phase can be obtained based on the formation of the pearlite phase through diffusion of carbon contained in the gas used at the time of sintering into iron.

[Sizing Step]

In the sizing step, sizing for finishing an inner peripheral surface and an outer peripheral surface of the sintered compact 30 into predetermined shapes (finished product shapes) is performed on the sintered compact 30. In this embodiment, the sizing step is carried out in two separate stages corresponding to a primary sizing step and a second sizing step. Each of the sizing steps is described specifically below with reference to the drawings.

Figure 6:
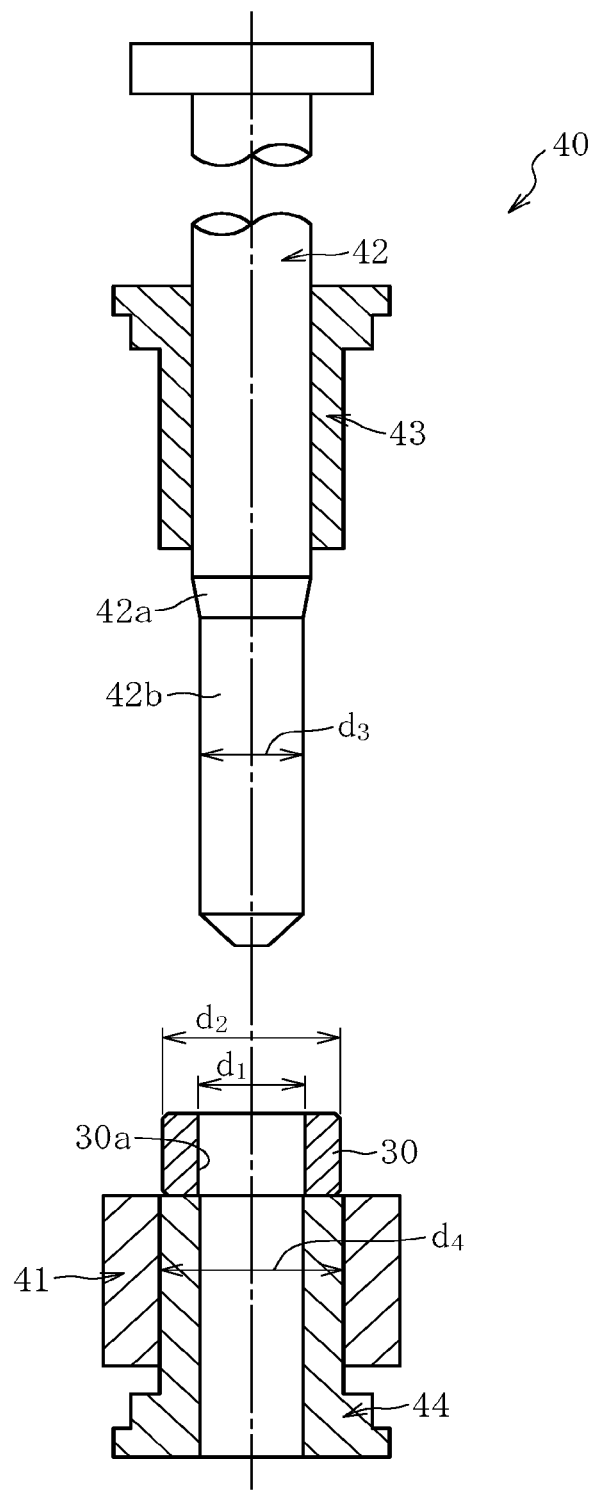
FIG. 6 is a schematic sectional view of a primary sizing mold used in a primary sizing step.

In the primary sizing step, the another-side increased-diameter portion 4 is formed by compression molding on an inner peripheral surface 30a of the sintered compact 30. A primary sizing mold 40 used in this step comprises, as illustrated in FIG. 6, a die 41 as a first die, a core 42 as a first sizing core, an upper punch 43, and a lower punch 44, which are arranged coaxially. The core 42, the upper punch 43, and the lower punch 44 can be raised and lowered by a drive mechanism (not shown).

An inner peripheral surface of the die 41 is formed as a cylindrical surface having a constant diameter. An inner-diameter dimension $d_4$ of the die 41 is set so as to allow the sintered compact 30 to be smoothly introduced into an inner periphery of the die 41 and to be capable of retaining the outer peripheral surface of the sintered compact 30 at the time of compression molding (see FIG. 7D) of the another-side increased-diameter portion 4. In order to achieve this, the inner-diameter dimension $d_4$ of the die 41 is set equal to or slightly larger than an outer-diameter dimension $d_2$ of the sintered compact 30. Specifically, a dimensional difference between the inner-diameter dimension $d_4$ of the die 41 and the outer-diameter dimension $d_2$ of the sintered compact 30 is set to, for example, about 10 μm or smaller ($0 \, \mu m \leq d_4 - d_2 \leq 10 \, \mu m$).

The core 42 comprises an another-side increased-diameter portion molding surface 42a (hereinafter also referred to simply as "molding surface 42a") corresponding to a shape of the another-side increased-diameter portion 4 and a cylindrical surface 42b having a constant diameter, which is formed below the molding surface 42a so as to be continuous therewith. An outer-diameter dimension $d_3$ of the cylindrical surface 42b is set so as not to come into contact with the inner peripheral surface 30a of the sintered compact 30 even during the compression molding of the another-side increased-diameter portion 4 (see FIG. 7D). Specifically, the outer-diameter dimension $d_3$ of the cylindrical surface 42b of the core 42 is set sufficiently smaller than the inner-diameter dimension $d_1$ of the sintered compact 30.

In the primary sizing mold 40 having the configuration described above, the sintered compact 30 is first placed on an upper end surface of the lower punch 44, which is flush with an upper end surface of the die 41, as illustrated in FIG. 6. Thereafter, the core 42 and the upper punch 43 are moved down to insert the cylindrical surface 42b of the core 42 into the inner periphery of the sintered compact 30, as illustrated in FIG. 7A. At this time, the inner peripheral surface 30a of the sintered compact 30 and the cylindrical surface 42b of the core 42 are opposed to each other through a radial clearance therebetween based on the above-mentioned dimensional relationship.

Thereafter, after the upper punch 43 is moved down so that the sintered compact 30 is sandwiched between the upper punch 43 and the lower punch 44 in the axial direction, that is, after elongational deformation of the sintered compact 30 in the axial direction is made restrictable, as illustrated in FIG. 7B, the core 42, the upper punch 43, and the lower punch 44 are moved down in an integrated manner so as to introduce the sintered compact 30 into the inner periphery of the die 41 as illustrated in FIG. 7C. After the sintered compact 30 is introduced into the inner periphery of the die 41, as illustrated in FIG. 7D, the core 42 is further moved down so as to gradually push the molding surface 42a into the inner periphery of the sintered compact 30. Along therewith, the sintered compact 30 is expansionally deformed in a radial direction thereof. As a result, the outer peripheral surface of the sintered compact 30 is retained by the inner peripheral surface of the die 41, while a partial cylindrical region of the inner peripheral surface 30a of the sintered compact 30 is pressed against the molding surface 42a of the core 42. As a result, the partial cylindrical region of the inner peripheral surface 30a of the sintered compact 30 is deformed in accordance with the molding surface 42a to mold the another-side increased-diameter portion 4. Even during the compression molding of the another-side increased-diameter portion 4 on the inner peripheral surface 30a of the sintered compact 30, the remaining cylindrical region of the inner peripheral surface 30a of the sintered compact 30 (region on which the cylindrical portion 2 and the one-side increased-diameter portion 3 are to be molded) and the cylindrical surface 42b of the core 42 are kept under a non-contact state. Therefore, in the primary sizing step, only the another-side increased-diameter portion 4 is compression-molded on the inner peripheral surface 30a of the sintered compact 30.

The sintered compact 30 comprising the another-side increased-diameter portion 4 molded on the inner peripheral surface in the above-mentioned manner is released from the primary sizing mold 40, as illustrated in FIG. 7E. The sintered compact 30 is released from the mold by, for example, moving up the core 42, the upper punch 43, and the lower punch 44 in an integrated manner to extract the sintered compact 30 from the die 41 and then further moving up the core 42 and the upper punch 43. Along therewith, an inner-diameter dimension and an outer-diameter dimension of the sintered compact 30 are increased due to spring back. Thus, the core 42 can be removed smoothly.

As described above, in the primary sizing step, only the another-side increased-diameter portion 4 is molded on the inner peripheral surface 30a of the sintered compact 30. Therefore, a surface opening ratio of the inner peripheral surface of the sintered compact which has been subjected to the primary sizing (the sintered compact is hereinafter also referred to as "sintered compact 30'") becomes relatively small in the region on which the another-side increased-diameter portion 4 is molded and becomes relatively large in the remaining cylindrical region (region on which the cylindrical portion 2 and the one-side increased-diameter portion 3 are to be molded). The another-side increased-diameter portion 4 is molded by pressing the another-side increased-diameter portion molding surface 42a having a tapered shape against the inner peripheral surface 30a of the sintered compact 30 having the cylindrical shape. Thus, the surface opening ratio in an axial range of the another-side increased-diameter portion 4 becomes the smallest at an end portion on the another axial side, that is, a side away from the cylindrical portion 2 and gradually increases toward the one axial side. Further, based on the embodiment of the primary sizing described above, the another-side increased-diameter portion 4 is a surface formed by the compression molding without being ironed by the core 42, that is, without the sliding on the core 42.

Figure 8:
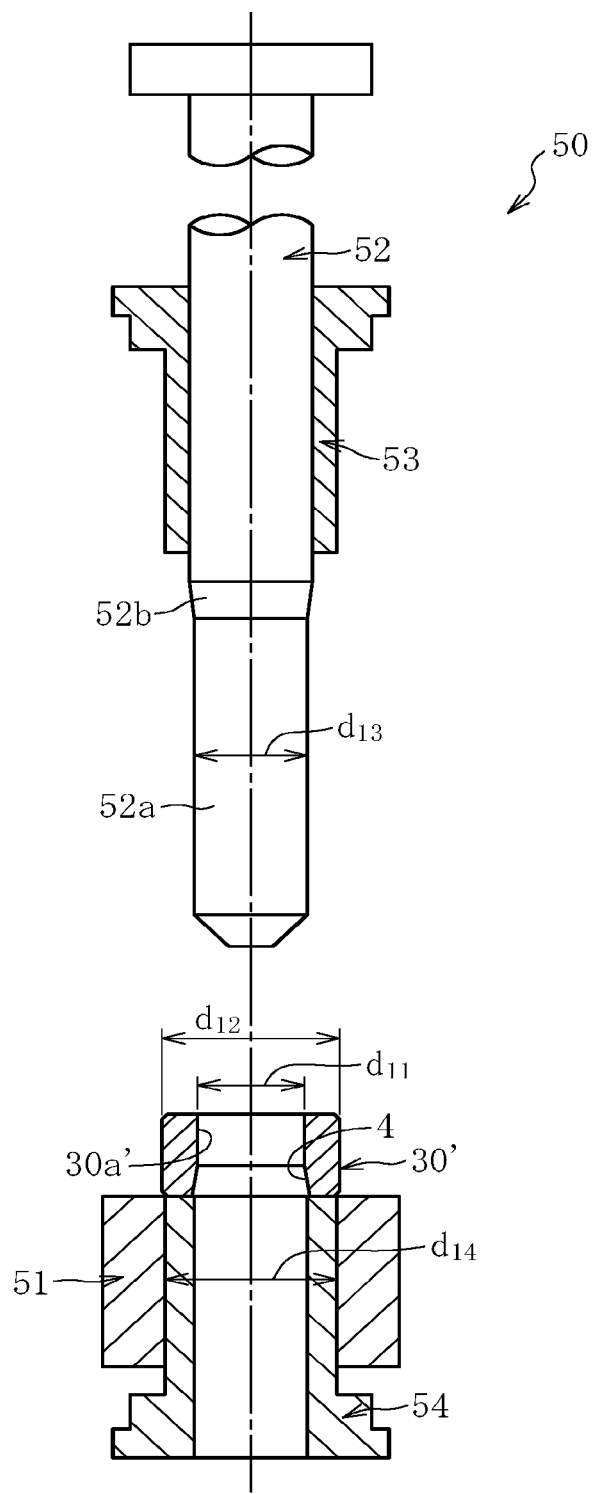
FIG. 8 is a schematic sectional view of a secondary mold used in a secondary sizing step.

In the secondary sizing step, the cylindrical portion 2 and the one-side increased-diameter portion 3 are molded on an inner peripheral surface of the sintered compact 30'. A secondary sizing mold 50 used in this step comprises, as illustrated in FIG. 8, a die 51 as a second die, a core 52 as a second sizing core, an upper punch 53, and a lower punch 54, which are arranged coaxially. The core 52, the upper punch 53, and the lower punch 54 can be raised and lowered by a drive mechanism (not shown).

An inner peripheral surface of the die 51 is formed as a cylindrical surface having a constant diameter. An inner-diameter dimension $d_{14}$ of the die 51 is set sufficiently smaller than an outer-diameter dimension $d_{12}$ of the sintered compact 30'. A dimensional difference ($d_{12} - d_{14}$) therebetween is set to, for example, from about 50 μm to about 60 μm.

The core 52 comprises a cylindrical portion molding surface 52a corresponding to a shape of the cylindrical portion 2 and a one-side increased-diameter portion molding surface 52b corresponding to a shape of the one-side increased-diameter portion 3, which is formed above the cylindrical portion molding surface 52a so as to be continuous therewith. An outer-diameter dimension $d_{13}$ of the cylindrical portion molding surface 52a is set larger than an inner-diameter dimension $d_{11}$ of a cylindrical inner peripheral surface (region on which the cylindrical portion 2 and the one-side increased-diameter portion 3 are to be molded) 30a' of the sintered compact 30'. A dimensional difference ($d_{13} - d_{11}$) therebetween is set to, for example, about 20 μm.

In the secondary sizing mold 50 having the configuration described above, the sintered compact 30' is first placed on an upper end surface of the lower punch 54, which is flush with an upper end surface of the die 51, as illustrated in FIG. 8. At this time, the sintered compact 30' is arranged in the secondary sizing mold 50 in an upright posture with the another-side increased-diameter portion 4, which is molded in the primary sizing step, being arranged on a lower side. Specifically, the sintered compact 30' is arranged in the secondary sizing mold 50 vertically inverted from the sintered compact 30 placed in the primary sizing mold 40.

After the sintered compact 30' is arranged in the secondary sizing mold 50, the core 52 and the upper punch 53 are moved down to insert the cylindrical portion molding surface 52a of the core 52 into an inner periphery of the sintered compact 30', as illustrated in FIG. 9A. At this time, the cylindrical portion molding surface 52a of the core 52 is inserted (press-fitted) into the inner periphery of the sintered compact 30' while sliding on a cylindrical inner peripheral surface 30a' of the sintered compact 30' based on the above-mentioned relationship between the outer-diameter dimension $d_{13}$ of the cylindrical portion molding surface 52a and the inner-diameter dimension $d_{11}$ of the sintered compact 30'. In this manner, the cylindrical inner peripheral surface 30a' of the sintered compact 30' is subjected to a slight amount of pore filling.

Next, after the upper punch 53 is moved down so that the sintered compact 30' is sandwiched in the axial direction between the upper punch 53 and the lower punch 54, that is, after elongational deformation of the sintered compact 30' in the axial direction is made restrictable, as illustrated in FIG. 9B, the core 52, the upper punch 53, and the lower punch 54 are moved down in an integrated manner so as to introduce the sintered compact 30' into the inner periphery of the die 51, as illustrated in FIG. 9C. At this time, because of the inner-diameter dimension $d_{14}$ of the die 51 set sufficiently smaller than the outer-diameter dimension $d_{12}$ of the sintered compact 30', the sintered compact 30' is introduced (press-fitted) into the inner periphery of the die 51 while the outer peripheral surface thereof is sliding on the inner peripheral surface of the die 51. When the sintered compact 30' is introduced into the inner periphery of the die 51, the elongational deformation of the sintered compact 30' in the axial direction is restricted, while the cylindrical inner peripheral surface 30a' is retained by an outer peripheral surface of the core 52. Therefore, along with the introduction of the sintered compact 30' into the inner periphery of the die 51, the outer peripheral surface of the sintered compact 30' is ironed by the inner peripheral surface of the die 51. As a result, the outer peripheral surface of the sintered compact 30' is molded, while a surface opening ratio of the outer peripheral surface of the sintered compact 30' is reduced. After the sintered compact 30' is introduced into the inner periphery of the die 51, the outer peripheral surface of the sintered compact 30' is retained by the die 51.

Under a state in which the outer peripheral surface of the sintered compact 30' is retained by the die 51, the core 52 is further moved down as illustrated in FIG. 9D. At this time, the core 52 is press-fitted into the cylindrical inner peripheral surface 30a' of the sintered compact 30'. Thus, along with the further downward movement of the core 52, a partial cylindrical region of the cylindrical inner peripheral surface 30a' of the sintered compact 30' is ironed by the cylindrical portion molding surface 52a of the core 52 to mold the cylindrical portion 2. Then, along with further progress of the downward movement of the core 52, the one-side increased-diameter portion molding surface 52b of the core 52 is pushed into an inner periphery of an upper part of the sintered compact 30'. Then, an upper cylindrical region of the cylindrical inner peripheral surface 30a' is deformed in accordance with the one-side increased-diameter portion molding surface 52b of the core 52 to mold the one-side increased-diameter portion 3. The one-side increased-diameter portion 3 is molded by further compressing the upper cylindrical region of the cylindrical inner peripheral surface 30a' to an outer diameter side with the one-side increased-diameter portion molding surface 52b under a state in which the outer peripheral surface of the sintered compact 30' is retained by the die 51, that is, under a state in which the elongational deformation of the sintered compact 30' in the axial direction is further restricted. Thus, the surface opening ratio (B) of the one-side increased-diameter portion 3 becomes smaller than the surface opening ratio (A) of the cylindrical portion 2. The one-side increased-diameter portion 3 is molded by pressing the one-side increased-diameter portion molding surface 52b having the tapered shape against the cylindrical inner peripheral surface 30a'. Thus, the surface opening ratio of the one-side increased-diameter portion 3 in the axial range becomes the smallest at the end portion on the one axial side, that is, a side away from the cylindrical portion 2 and gradually increases toward the another axial side.

In this embodiment, in consideration of the dimensional relationship (see FIG. 6) between the outer-diameter dimension $d_2$ of the sintered compact 30 being subjected to the primary sizing and the inner-diameter dimension $d_4$ of the die 41 used in the primary sizing and the dimensional relationship (see FIG. 8) between the outer-diameter dimension $d_{12}$ of the sintered compact 30' being subjected to the secondary sizing and the inner-diameter dimension $d_{14}$ of the die 51 used in the secondary sizing, a retention force for the outer peripheral surface of the sintered compact during the compression molding of the one-side increased-diameter portion 3 becomes larger than a retention force for the outer peripheral surface of the sintered compact during the compression molding of the another-side increased-diameter portion 4. Therefore, the amount of compression of the inner peripheral surface of the sintered compact with the one-side increased-diameter portion molding surface 52b of the core 52 becomes relatively larger than the amount of compression of the inner peripheral surface of the sintered compact with the another-side increased-diameter portion molding surface 42a of the core 42. As a result, the surface opening ratio (B) of the one-side increased-diameter portion 3 can be set significantly smaller than the surface opening ratio (C) of the another-side increased-diameter portion 4. In short, after the secondary sizing is carried out, the surface opening ratio (B) of the one-side increased-diameter portion 3 becomes the smallest and the surface opening ratio (C) of the another-side increased-diameter portion 4 becomes the largest as the surface opening ratio of the inner peripheral surface of the sintered compact (C>A>B).

In the manner described above, the sintered compact 30' comprising the cylindrical portion 2 and the one-side increased-diameter portion 3 molded on the inner peripheral surface is released from the secondary sizing mold 50, as illustrated in FIG. 9E. When the sintered compact 30' is released from the secondary sizing mold 50, the following procedure is carried out. Specifically, the core 42, the upper punch 43, and the lower punch 44 are moved up in an integrated manner to extract the sintered compact 30' from the die 41. Thereafter, the core 42 and the upper punch 43 are further moved up.

When the sintered compact 30' is released from the secondary sizing mold 50, the following procedure may be carried out. Specifically, the core 52 and the upper punch 53 are moved up in an integrated manner to remove the core 52 from the sintered compact 30'. Thereafter, the lower punch 54 is moved up to extract the sintered compact 30' from the die 51. When the above-mentioned procedure is employed, the removal of the core 52 is so-called forcible removal. Therefore, the cylindrical portion 2 is additionally ironed. As a result, the surface opening ratio of the cylindrical portion 2 can be further reduced. Even when the sintered compact 30' is released from the mold in the above-mentioned procedure, a magnitude relationship between the surface opening ratio of the cylindrical portion 2 and the surface opening ratio of the one-side increased-diameter portion 3 remains unchanged.

[Oil-Impregnating Step]

Although detailed illustration is omitted, in the oil-impregnating step, the inner pores of the sintered compact 30' finished to have the finished product shape in the sizing step by a technique such as vacuum impregnation are impregnated with the lubricating oil, for example, the ester-based lubricating oil. As a result, the sintered bearing (oil-impregnated sintered bearing) 1 illustrated in FIG. 1 is completed.

In the thus obtained sintered bearing 1, the another-side increased-diameter portion 4 is molded by the sizing (primary sizing) without involving the ironing with the core 42 of the primary sizing mold 40. Thereafter, the cylindrical portion 2 and the one-side increased-diameter portion 3 are molded by the sizing (secondary sizing) involving the ironing with the core 52 of the secondary sizing mold 50. Further, the surface opening ratio A of the cylindrical portion 2, the surface opening ratio B of the one-side increased-diameter portion 3, and the surface opening ratio C of the another-side increased-diameter portion 4 have the relationship: C>A>B as a result of the primary sizing and the secondary sizing described above. With the relationship described above, the portions 2 to 4 described above are not all required to be formed by the compression molding for the molding of the cylindrical portion 2, the one-side increased-diameter portion 3, and the another-side increased-diameter portion 4, which have the surface opening ratios different from each other, on the inner peripheral surface of the sintered bearing 1. The cylindrical portion 2 is molded by ironing the cylindrical inner peripheral surface 30a' of the sintered compact 30'. Therefore, the sizing performed on the sintered compact 30 is not required to be carried out with three kinds of sizing molds unlike a case where the portions 2 to 4 described above are respectively formed by the compression molding, and only needs to be carried out separately in two stages. Thus, the sintered bearing 1 can be obtained at low cost.

Further, the cylindrical portion 2 and the one-side increased-diameter portion 3 which are to be formed on the inner peripheral surface of the sintered bearing 1 are molded by performing the sizing (secondary sizing) using the core 52 comprising the molding surfaces 52a and 52b respectively corresponding to the shapes thereof formed continuously in the axial direction, on the sintered compact 30'. In addition, the one-side increased-diameter portion 3 is molded under a state in which the outer peripheral surface of the sintered compact 30' is retained by the die 51 and the inner peripheral surface (region of the inner peripheral surface, on which the cylindrical portion 2 is to be molded) of the sintered compact 30' is retained by the cylindrical portion 52a of the core 52. In this case, even when a shift in thickness occurs in the inner peripheral portion of the sintered compact along with the pushing of the one-side increased-diameter portion molding surface 52b of the core 52, the thickness is shifted not forward in a direction of movement of the core 52, that is, toward the cylindrical portion 2, but mainly toward a center of the sintered compact 30' in the radial direction (thickness direction). In this manner, not only the cylindrical portion 2 and the one-side increased-diameter portion 3 but also a boundary portion between the portions 2 and 3, specifically, the whole region of the inner peripheral surface of the sintered bearing 1, which relates to the support of the shaft 262, can be molded into target shapes in the single step. Therefore, regardless of whether or not the shaft 262 is inclined to the axis line, the sintered bearing 1 capable of supporting the shaft 262 with high accuracy over a long period of time can be manufactured and provided at low cost.

Further, in the secondary sizing step, the one-side increased-diameter portion 3 is molded by pressing the one-side increased-diameter portion molding surface 52b of the core 52 against the region of the inner peripheral surface of the sintered compact 30', on which the cylindrical portion molding surface 52a slides along with the press-fit of the cylindrical portion molding surface 52a of the core 52. In short, in the sintered bearing 1 according to this embodiment, the cylindrical portion 2 has a surface molded by being ironed with the cylindrical portion molding surface 52a formed on the core 52, whereas the one-side increased-diameter portion 3 has a surface formed by the compression molding with the one-side increased-diameter portion molding surface 52b formed on the core 52 through the ironing with the cylindrical portion molding surface 52a formed on the core 52.

Figure 10A:
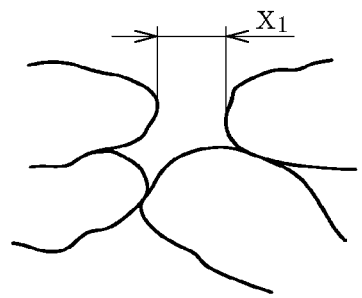
FIG. 10A is an enlarged view for schematically illustrating a surface layer portion of a sintered compact before sizing.
Figure 10B:
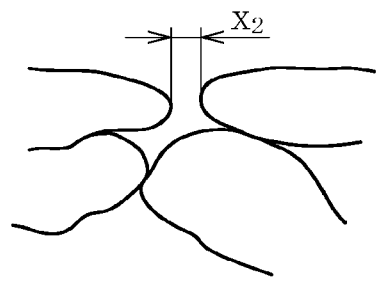
FIG. 10B is an enlarged view for schematically illustrating a surface of a cylindrical portion.
Figure 10C:
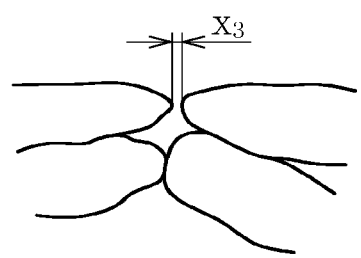
FIG. 10C is an enlarged view for schematically illustrating a surface of a one-side increased-diameter portion.

In this case, as schematically illustrated in FIG. 10B, a surface opening diameter $x_2$ of the cylindrical portion 2 becomes smaller than a surface opening diameter $x_1$ of the sintered compact before the sizing, which is schematically illustrated in FIG. 10A, due to expansion of a metal structure of a surface of the sintered compact, which is caused along with the ironing process ($x_1 > x_2$). Further, as schematically illustrated in FIG. 10C, a surface opening diameter $x_3$ of the one-side increased-diameter portion 3 becomes smaller than the surface opening diameter $x_2$ of the cylindrical portion 2 due to increase in density of the metal structure of the surface layer portion of the sintered compact, which is caused along with the compression molding process involving a larger amount of compression than that of the ironing process described above ($x_2 > x_3$). Therefore, after the secondary sizing step, the sintered bearing 1 in which the surface opening ratio of the one-side increased-diameter portion 3 becomes smaller than the surface opening ratio of the cylindrical portion 2, specifically, the sintered bearing 1 capable of supporting, with high accuracy, the shaft 262 rotated relative to the sintered bearing 1 under an inclined state with respect to the axis line can be easily obtained.

Figure 10D:
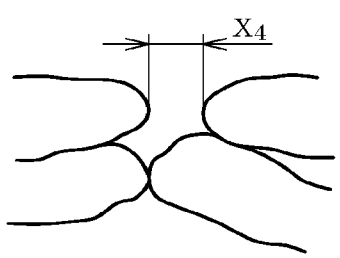
FIG. 10D is an enlarged view for schematically illustrating a surface of another-side increased-diameter portion.

As described above, the another-side increased-diameter portion 4 has the surface, which is compression-molded without the ironing in the primary sizing and is compression-molded in the primary sizing with a relatively smaller amount of retention of the outer peripheral surface than the amount of retention of the outer peripheral surface of the sintered compact in the secondary sizing. Thus, a diminution of the surface opening diameter, which occurs along with the compression molding process, becomes smaller than a diminution of the surface opening diameter, which occurs along with the ironing (sliding with the core 52). Therefore, as schematically illustrated in FIG. 10D, although a surface opening diameter $x_4$ of the another-side increased-diameter portion 4 becomes smaller than the surface opening diameter $x_1$ of the sintered compact before the sizing (primary sizing), the surface opening diameter $x_4$ becomes larger than the surface opening diameter $x_2$ of the cylindrical portion 2

($x_1 > x_4 > x_2$). Therefore, the sintered bearing 1 in which the surface opening ratio (C) of the another-side increased-diameter portion 4 becomes larger than the surface opening ratio (A) of the cylindrical portion 2 and the surface opening ratio (B) of the one-side increased-diameter portion 3 on the inner peripheral surface can be obtained. In the sintered bearing 1 described above, the lubricating oil can be moved, that is, can be caused to flow and circulate between the inner pores of the sintered bearing 1 and the bearing clearance mainly through surface openings of the another-side increased-diameter portion 4, as described above. Thus, change in characteristics of the lubricating oil can be prevented as much as possible so that the shaft 262 can be stably supported over a long period of time.

The sintered bearing 1 and the manufacturing method therefor according to the one embodiment of the first invention of the present application have been described above. However, the embodiment of the first invention is not limited thereto.

Figure 11:
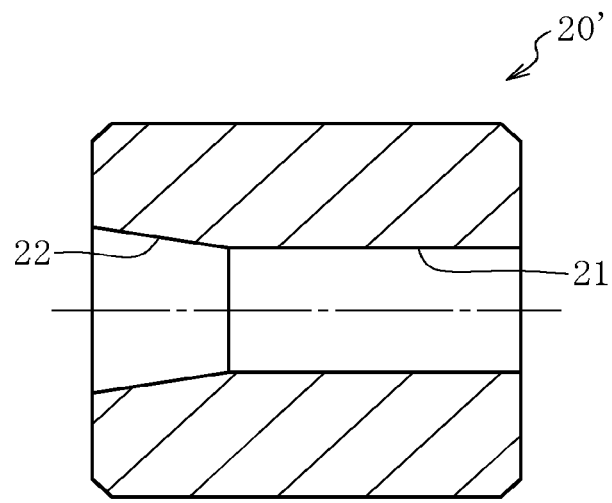
FIG. 11 is a schematic sectional view of a green compact according to another embodiment of the first invention.

For example, in the compression molding step involved in a manufacturing step for the sintered bearing 1, a green compact 20' comprising an increased-diameter portion 22 having a diameter gradually increased toward the another axial side on a partial region of an inner peripheral surface 21, more specifically, a region on which the another-side increased-diameter portion 4 is to be molded, can also be molded, as schematically illustrated in FIG. 11. In this case, as long as the primary sizing using the primary sizing mold 40 illustrated in FIG. 6 is performed on a sintered compact obtained by sintering the green compact 20', the amount of compression of the inner peripheral surface of the sintered compact in the primary sizing becomes relatively small. Thus, the sintered bearing comprising the another-side increased-diameter portion 4 having the surface opening ratio set larger than that of the sintered bearing 1 illustrated in FIG. 1 can be obtained. With the sintered bearing described above, the amount of drawing of the lubricating oil through the surface openings of the another-side increased-diameter portion 4 can be increased.

Figure 12:
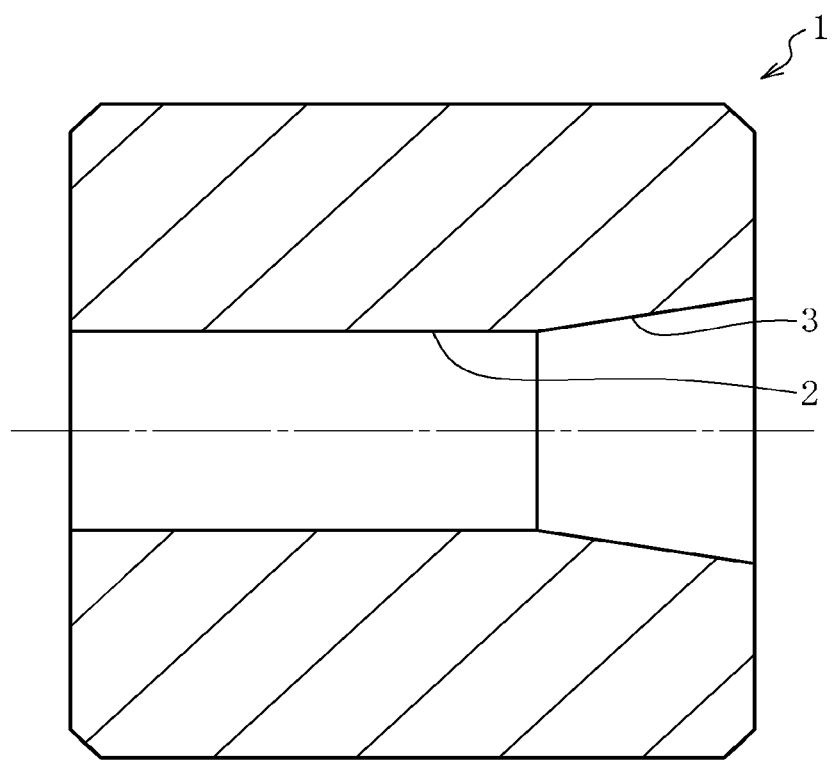
FIG. 12 is a schematic sectional view of a sintered bearing according to the another embodiment of the first invention.

Further, the method of manufacturing a sintered bearing according to the first invention of the present application is also applicable to the sintered bearing 1 comprising only the cylindrical portion 2 and the one-side increased-diameter portion 3 on the inner peripheral surface without comprising the another-side increased-diameter portion 4 on the inner peripheral surface, as illustrated in FIG. 12. In this case, the one-side increased-diameter portion 3 corresponds to "increased-diameter portion" defined in the first invention. Specifically, in the sizing step of manufacturing the sintered bearing 1 described above, the primary sizing step which has been described with reference to FIG. 6 and FIG. 7A to FIG. 7E is omitted, and only the secondary sizing step which has been described with reference to FIG. 8 and FIG. 9A to FIG. 9E is carried out. Specifically, in this case, the die 51 as the second die and the core 52 as the second sizing core used in the secondary sizing step respectively correspond to "die" and "sizing core" defined in the first invention relating to the manufacturing method. Further, the cylindrical portion molding surface 52a and the one-side increased-diameter portion molding surface 52b formed on the core 52 correspond respectively to "cylindrical portion molding surface" and "increased-diameter portion molding surface" defined in the first invention relating to the manufacturing method.

Although the case where the sintered bearing 1 according to the first invention of the present application is applied to the power transmission mechanism for a power window has been described above, the sintered bearing 1 may be used for another purpose. For example, the sintered bearing 1 is also applicable to a vibration motor functioning as a vibrator of a cell phone or the like.

Further, the sintered bearing 1 can be used not only for the purpose in which the another-side increased-diameter portion 4 does not function as the bearing surface but also for the purpose in which the another-side increased-diameter portion 4 functions as the bearing surface, specifically, a shaft to be supported slides on (comes into contact with) the another-side increased-diameter portion 4.

Further, the case where the sintered bearing 1 is used for the purpose in which the shaft 262 to be rotated is supported has been described in the embodiment described above, but the purpose of use of the sintered bearing 1 is not limited thereto. The sintered bearing 1 can also be used for the purpose in which the sintered bearing 1 is rotated with the shaft 262 being fixed or for the purpose in which both the shaft 262 and the sintered bearing 1 are rotated.

Figure 13:
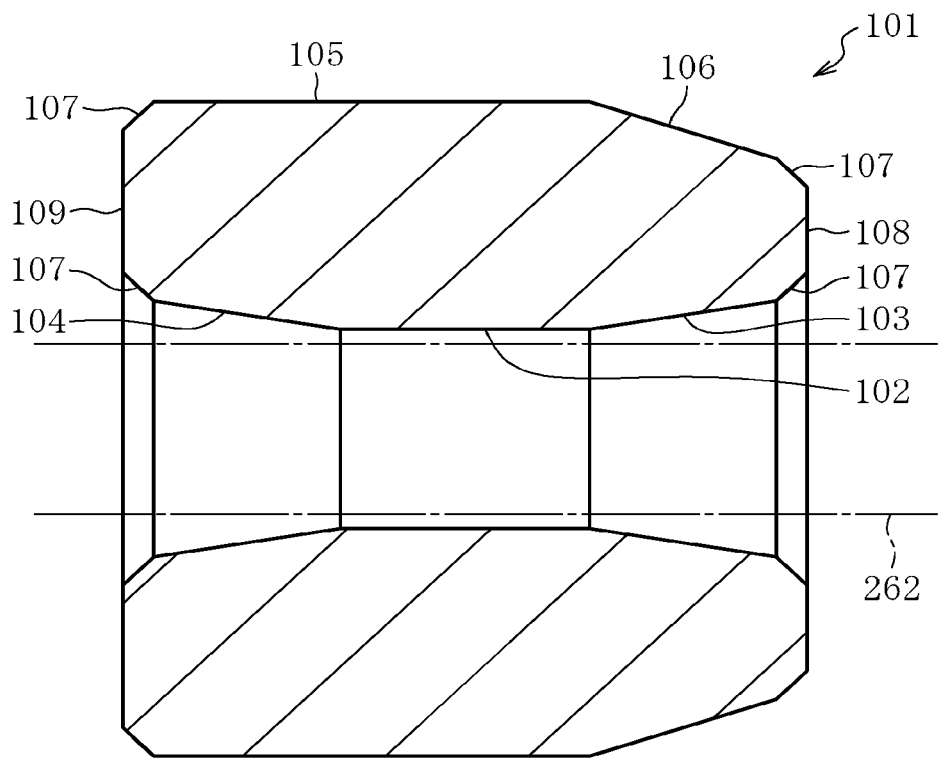
FIG. 13 is a sectional view of a sintered bearing according to one embodiment of a second invention.

In FIG. 13, a sintered bearing (oil-impregnated sintered bearing) 101 according to one embodiment of a second invention of the present application is illustrated. The sintered bearing 101 is assembled as, for example, a bearing 265 of the power transmission mechanism for a power window illustrated in FIG. 24. In this embodiment, there is described a case where the sintered bearings 101 are provided as a pair of the bearings 265 configured to support the shaft 262 in the vicinities of both sides of the worm gear 263 in the axial direction. In the following description of the sintered bearing 101, a side closer to the worm gear 263 in the axial direction is referred to as "one axial side", whereas a side opposite thereto is referred to as "another axial side".

The sintered bearing 101 is formed of a sintered compact having a tubular shape, and includes inner pores impregnated with the lubricating oil. The sintered bearing 101 is formed of, for example, a copper-based sintered compact, an iron-based sintered compact, or a copper-iron based sintered compact, and is formed of a copper-iron based sintered compact containing copper and iron as main components in this embodiment.

The sintered bearing 101 has a substantially cylindrical shape, and comprises, on an inner peripheral surface, a cylindrical portion 102 and an increased-diameter portion having a diameter gradually increased toward the one axial side, which is provided so as to be adjacent to the one axial side (right side in FIG. 13) of the cylindrical portion 102. In the illustrated example, a first tapered portion 103 as the increased-diameter portion is formed on the one axial side of the cylindrical portion 102. On the another axial side (left side in FIG. 13) of the cylindrical portion 102, a second tapered portion 104 as another increased-diameter portion having a diameter gradually increased toward the another axial side is formed. The first tapered portion 103 and the second tapered portion 104 are inclined at the same angle to the axial direction. An inclination angle thereof is set to, for example, from 1° to 3°, preferably, from 1° to 2°. In FIG. 13, the inclination angles of both of the tapered portions 103 and 104 are illustrated in an exaggerated manner. In the illustrated example, an axial dimension of the tapered portion 103 and an axial dimension of the tapered portion 104 are equal to each other.

The cylindrical portion 102 functions as a bearing surface configured to support the shaft 262. When the shaft 262 is warped by the force F (see FIG. 24) received by the worm gear 263 from the worm wheel 264, the first tapered portion 103 functions as a bearing surface configured to support the shaft 262. The second tapered portion 103 does not function as a bearing surface regardless of a state of the shaft 262, that is, the second tapered portion 103 and the shaft 262 do not slide against each other. On an inner peripheral surface of the sintered bearing 101, a density becomes higher, that is, a surface opening ratio becomes smaller, in the order of the second tapered portion 104, the cylindrical portion 102, and the first tapered portion 103.

On an outer peripheral surface of the sintered bearing 101, a low-density portion and a high-density portion having a density higher than that of the low-density portion are formed. In this embodiment, on the outer peripheral surface of the sintered bearing 101, an outer peripheral cylindrical portion 105 is formed as the low-density portion, and a small-diameter portion having a diameter smaller than the outer peripheral cylindrical portion 105 is formed as the high-density portion on the one axial side of the outer peripheral cylindrical portion 105. In the illustrated example, an outer peripheral tapered portion 106 having a diameter gradually decreased toward the one axial side is formed as the small-diameter portion at one axial end portion of the outer peripheral surface of the sintered bearing 101.

The outer peripheral tapered portion 106 is formed on the inner peripheral surface in an axial region of the first tapered portion 103. In the illustrated example, the outer peripheral tapered portion 106 is formed over the entire axial region of the first tapered portion 103. Specifically, the outer peripheral tapered portion 106 is formed in the same axial region as that of the first tapered portion 103. Both one axial end of the first tapered portion 103 and one axial end of the outer peripheral tapered portion 106 reach chamfered portions 107, whereas another axial end of the first tapered portion 103 and another axial end of the outer peripheral tapered portion 106 are arranged at the same position in the axial direction. An inclination angle of the outer peripheral tapered portion 106 with respect to the axial direction is larger than an inclination angle of the tapered portion 103 and an inclination angle of the tapered portion 104 formed on the inner peripheral surface, and is set, for example, from 5° to 20°, preferably, from 10° to 15°. A structure of the outer peripheral tapered portion 106 is not limited to that described above. For example, the another axial end of the outer peripheral tapered portion 106 may be extended toward the another axial end beyond the another axial end of the first tapered portion 103.

The chamfered portions 107 are formed at both axial ends of the inner peripheral surface and at both axial ends of the outer peripheral surface of the sintered bearing 101. Specifically, the chamfered portions 107 are formed between an end surface 109 on the one axial side and the first tapered portion 103 and between the end surface 109 and the outer peripheral tapered portion 106. Further, the chamfered portions 107 are formed between an end surface 109 on the another axial side and the second tapered portion 104 and between the end surface 109 and the outer peripheral cylindrical portion 105 formed on the outer peripheral surface. Each of the chamfered portions 107 is formed as a tapered surface having a larger inclination angle with respect to the axial direction than those of the first tapered portion 103, the second tapered portion 104, and the outer peripheral tapered portion 106, and is formed as a tapered surface inclined at about 45° with respect to the axial direction in the illustrated example. The inclination angles of the first tapered portion 103, the second tapered portion 104, and the outer peripheral tapered portion 106 are illustrated in an exaggerated manner in the illustrated example, and thus a radial dimension of each of the chamfered portions 107 is illustrated as being equal to or smaller than radial dimensions of the tapered portions 103, 104, and 106. In practice, however, the radial dimension of each of the chamfered portions 107 is larger than the radial dimensions of the tapered portions 103, 104, and 106.

The sintered bearing 101 having the configuration described above is manufactured through the mixing step, the compression molding step, the sintering step, the sizing step, and the oil impregnating step in the stated order. Each of the steps is specifically described below.

[Mixing Step]

In the mixing step, the main raw material powder, the low-melting point metal powder, and the solid lubricant powder are mixed in a mixing machine to manufacture the raw material powder. Various types of molding aids, for example, a lubricant, such as metal soap, for improvement of mold releasability is added to the raw material powder as needed.

Figure 14:
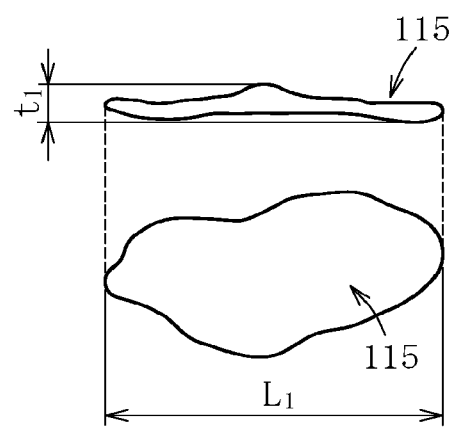
FIG. 14 is a view for illustrating flat copper powder with a side view thereof on an upper side and a plan view thereof on a lower side.

The main raw material powder is the metal powder containing copper and iron. In this embodiment, the partially diffusion-alloyed powder containing copper and iron and the flat copper powder is used as the main raw material powder. For example, the Fe—Cu partially diffusion-alloyed powder in which copper is caused to be diffused on and adhere to the surface of iron powder or iron alloy powder is used as the partially diffusion-alloyed powder. The flat copper powder is obtained by flattening the raw material copper powder containing the water-atomized powder and the like through stamping. As the flat copper powder, there is mainly used flat copper powder having a grain length $L_1$ of from 20 μm to 80 μm and a grain thickness $t_1$ of from 0.5 μm to 1.5 μm (aspect ratio $L_1/t_1$=13.3 to 160). As illustrated in FIG. 14, the "length" and the "thickness" herein refer to the maximum geometric dimensions of individual grains 115 of the flat copper powder. The apparent density of the flat copper powder is set to equal to or smaller than 1.0 g/cm$^3$. It is preferred that the fluid lubricant be caused to adhere in advance to the flat copper powder before mixture with the raw material powder. As the fluid lubricant, a fatty acid, in particular, a linear saturated fatty acid, specifically, stearic acid can be used. The main raw material powder is not limited to that described above. For example, copper powder (pure copper powder or copper alloy powder) and iron powder (pure iron powder or iron alloy powder) can also be used.

As the low-melting point metal powder, metal powder having a melting point set lower than a sintering temperature, for example, powder of tin, zinc, or phosphorus is used. Those low-melting point metal powders have high wettability to copper. During the sintering, the low-melting point metal, for example, tin melts first to wet the surface of the copper and form copper-tin alloy layers. The adjacent copper-tin alloy layers of the partially diffusion-alloyed powder are bonded to each other in a diffused manner. As a result, a coupling strength between the grains of the partially diffusion-alloyed powder is increased.

The solid lubricant powder is added so as to reduce friction with the shaft 262. For example, graphite powder is used. As the graphite powder, artificial graphite powder or natural graphite powder can be used.

For the above-mentioned raw material powder, the blend ratio of respective powders is, for example, the Fe—Cu partially diffusion-alloyed powder at from 75 wt % to 90 wt %, the flat copper powder at from 8 wt % to 20 wt %, the tin powder at from 0.8 wt % to 6.0 wt %, and the graphite powder at from 0.5 wt % to 2.0 wt %.

[Compression Molding Step]

Figure 15:
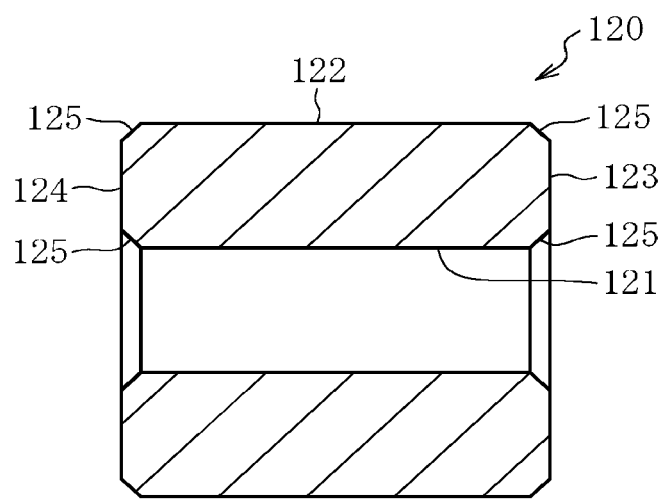
FIG. 15 is a sectional view of a green compact being a precursor of the sintered bearing illustrated in FIG. 13.

In the compression molding step, the raw material powder is loaded into the mold (not shown) and then is compressed, thereby molding a green compact 120 illustrated in FIG. 15. Each of an inner peripheral surface 121 and an outer peripheral surface 122 of the green compact 120 is formed in an cylindrical surface shape which is straight over the entire region in the axial direction. Chamfered portions 125 are formed in the green compact 120 between the inner peripheral surface 121 and an end surface 123, between the inner peripheral surface 121 and an end surface 124, between the outer peripheral surface 122 and the end surface 123, and between the outer peripheral surface 122 and the end surface 124.

In this embodiment, the raw material powder contains the flat copper powder. Thus, when the raw material powder is loaded into the mold or the raw material powder is compressed with the mold, the flat copper powder adheres to the molding surface of the mold. Thus, a large amount of the flat copper powder is exposed on a surface of the green compact 120. The flat copper powder is arranged so that a direction of each of the grains, which is orthogonal to a thickness, extends along the surface of the green compact 120. By distributing copper on the surface of the green compact 120 in a scattered manner as described above, an area ratio of copper can be maximized in a portion (bearing surface) of the sintered bearing 101, which can slide on the shaft 262. Thus, slidability with the shaft 262 can be increased.

[Sintering Step]

In the sintering step, the green compact 120 is sintered in a furnace to obtain a sintered compact 130. A sintering temperature is set lower than a melting point of the main row material powder (melting point of copper in this embodiment) and higher than a melting point of the low-melting point metal powder (melting point of tin in this embodiment), and is set to, for example, 820° to 900°.

[Sizing Step]

In the sizing step, the sintered compact 130 is compressed to be molded into a predetermined shape. In this embodiment, the primary sizing step and the secondary sizing step are carried out as the sizing step. In the drawings for illustrating the sizing step, only left half of the sintered bearing 130 and the sizing mold is illustrated. Further, illustration of the chamfered portions formed on the sintered compact 130 is omitted.

Figure 16A:
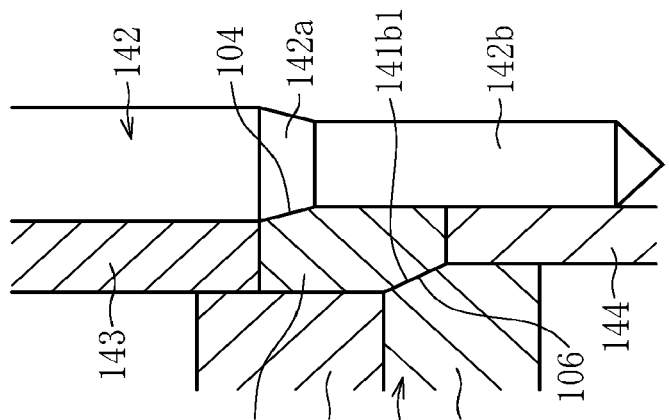
FIG. 16A is a sectional view for illustrating an initial stage of a primary sizing step.
Figure 16B:
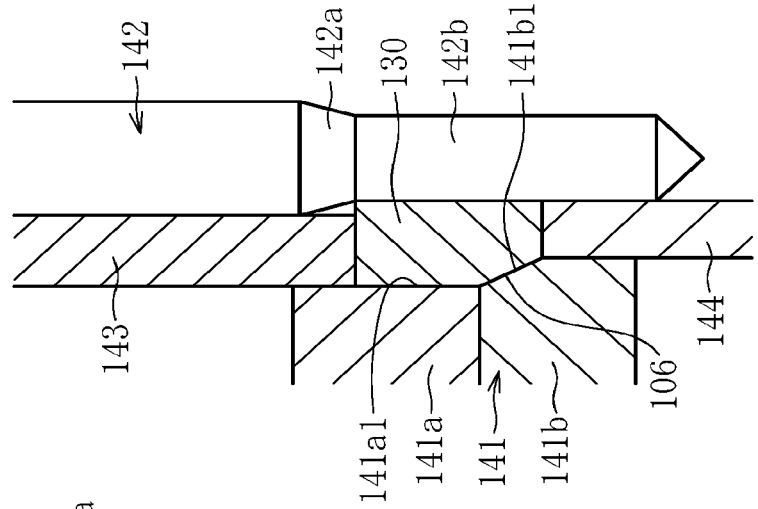
FIG. 16B is a sectional view for illustrating a stage during the primary sizing step.
Figure 16C:
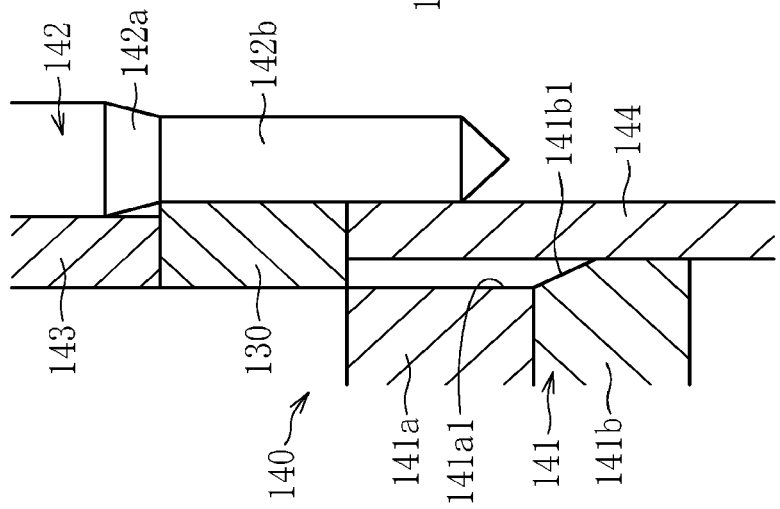
FIG. 16C is a sectional view for illustrating a stage during the primary sizing step.

In the primary sizing step, an inner peripheral surface of the sintered compact 130 is compressed to mold the second tapered portion 104, while an outer peripheral surface of the sintered compact 130 is compressed to mold the outer peripheral tapered portion 106. A primary sizing mold 140 used in this step comprises a die 141, a core 142, an upper punch 143, and a lower punch 144, as illustrated in FIG. 16A to FIG. 16C. The die 141 comprises an upper die 141a having a cylindrical surface 141a1 on an inner peripheral surface and a lower die 141b having a tapered surface 141b1 with a downwardly decreased diameter on an inner peripheral surface. The core 142 comprises a tapered portion 142a with a downwardly decreased diameter and a cylindrical portion 142b formed below the tapered portion 142a.

Specifically, first, as illustrated in FIG. 16A, the cylindrical portion 142b of the core 142 is inserted into an inner periphery of the sintered compact 130. Although specific illustration is omitted, an outer diameter of the cylindrical portion 142b is slightly smaller than an inner diameter of the sintered compact 130. The cylindrical portion 142b and the sintered compact 130 are fitted to each other through a radial clearance therebetween. Under this state, the upper punch 143 is moved down to insert the sintered compact 130 into an inner periphery of the upper die 141a. At this time, the outer peripheral surface of the sintered compact 130 and the cylindrical surface 141a1 of the upper die 141a are fitted to each other through a radial clearance therebetween. The radial clearance between the outer peripheral surface of the sintered compact 130 and the cylindrical surface 141a1 of the upper die 141a is smaller than a radial clearance between the inner peripheral surface of the sintered compact 130 and the cylindrical portion 142b of the core 142.

Thereafter, as illustrated in FIG. 16B, the upper punch 143 and the core 142 are further moved down to push a lower end of the sintered compact 130 into an inner periphery of the lower die 141b. As a result, a shape of the lower die 141b is transferred to the outer peripheral surface of the sintered compact 130, thereby molding the outer peripheral tapered portion 106 at a lower end of the outer peripheral surface of the sintered compact 130. After the outer peripheral tapered portion 106 is molded on the outer peripheral surface of the sintered compact 130 in this manner, the downward movement of the sintered compact 130 is stopped. Thereafter, the upper punch 143 is slightly moved down to compress the sintered compact 130 in the axial direction to cause the sintered compact 130 to expansion deform in the radial direction (increase a diameter of the outer peripheral surface of the sintered compact 130) to bring the outer peripheral surface of the sintered compact 130 into close contact with the inner peripheral surface 141a1 of the upper die 141a. At this time, a diameter of the inner peripheral surface of the sintered compact 130 is decreased. It is preferred that the amount of decrease in diameter thereof be set to such an extent that the inner peripheral surface of the sintered compact 130 does not come into contact with the cylindrical portion 142b of the core 142.

Thereafter, as illustrated in FIG. 16C, the core 142 is moved down to push the tapered portion 142a of the core 142 into the inner periphery of the sintered compact 130. As a result, a shape of the tapered portion 142a of the core 142 is transferred to the inner peripheral surface of the sintered compact 130 to mold the second tapered portion 104 on an upper end of the inner peripheral surface of the sintered compact 130. During the molding of the sintered compact 130 with the primary sizing mold 140 in this manner, the radial clearance is maintained between the inner peripheral surface of the sintered compact 130 and the outer peripheral surface of the cylindrical portion 142b of the core 142. Specifically, in the primary sizing step, a region of the inner peripheral surface of the sintered compact 130 except for the second tapered portion 104 is not molded with the core 142.

As described above, in the primary sizing step, the sintered compact 130 is compressed by the die 141, the core 142, the upper punch 143, and the lower punch 144. As a result, a density of the sintered compact 130 is increased. In particular, the amount of compression in the radial direction becomes larger for the outer peripheral tapered portion 106 of the outer peripheral surface of the sintered compact 130 than for another region (cylindrical region) of the outer peripheral surface. Therefore, the outer peripheral tapered portion 106 has a higher density than that of the another region of the outer peripheral surface. Further, the amount of compression in the radial direction becomes larger for the second tapered portion 104 of the inner peripheral surface of the sintered compact 130 than for another region. Thus, the second tapered portion 104 has a higher density than that of the another region (cylindrical region) of the inner peripheral surface. An inclination angle of the outer peripheral tapered portion 106 with respect to the axial direction is larger than an inclination angle of the second tapered portion 104 with respect to the axial direction. Thus, the amount of compression of the outer peripheral tapered portion 106 in the primary sizing is larger than that of the second tapered portion 104. Therefore, the outer peripheral tapered portion 106 has a higher density than that of the second tapered portion 104.

As described above, a density of a surface of the sintered compact 130 which has been subjected to the primary sizing becomes smaller in the order of the outer peripheral tapered portion 106, the second tapered portion 104, and the cylindrical region on the outer peripheral surface and the cylindrical region on the inner peripheral surface. Further, a surface opening ratio of the sintered compact 130 becomes larger in the order of the outer peripheral tapered portion 106, the second tapered portion 104, and the cylindrical region on the outer peripheral surface and the cylindrical region on the inner peripheral surface.

In the secondary sizing step, the cylindrical portion 102 and the first tapered portion 103 are molded on the inner peripheral surface of the sintered compact 130 which has been subjected to the primary sizing step, while the outer peripheral cylindrical portion 105 is molded on the outer peripheral surface of the sintered compact 130. A secondary sizing mold 150 used in this step comprises a die 151, a core 152, an upper punch 153, and a lower punch 154, as illustrated in FIG. 17A to FIG. 17C. An inner peripheral surface of the die 151 is formed to have a straight cylindrical surface shape. The core 152 comprises a tapered portion 152a with a downwardly decreased diameter and a cylindrical portion 152b formed below the tapered portion 152a.

Specifically, first, as illustrated in FIG. 17A, the sintered compact 130 is placed on the lower punch 154 of the secondary sizing mold 150. At this time, the sintered compact 130 is arranged so that the second tapered portion 104 molded on the inner peripheral surface in the primary sizing step is positioned on a lower side. Specifically, the sintered compact 130 is arranged in the secondary sizing mold in a state of being vertically inverted from a state of being arranged in the primary sizing mold. Then, the cylindrical portion 152b of the core 152 is press-fitted into the inner periphery of the sintered compact 130. As a result, the cylindrical region of the sintered compact 130 comprising the region which later becomes the first tapered portion 103 is compression-molded to increase a density. At this time, the cylindrical region of the sintered compact 130 slides on an outer peripheral surface of the cylindrical portion 152b of the core 152 while being held in pressure-contact therewith. Thus, the surface of the cylindrical region is brought into a pore-filled state. In this manner, a part of the cylindrical region of the inner peripheral surface of the sintered compact 130, which is molded with the cylindrical portion 152b of the core 152, is formed as the cylindrical portion 102.

Thereafter, as illustrated in FIG. 17B, the sintered compact 130 is moved down to be press-fitted into the inner periphery of the die 151. As a result, the cylindrical region of the outer peripheral surface of the sintered compact 130 except for the outer peripheral tapered portion 106 is compression-molded with the inner peripheral surface of the die 151 to have an increased density, and slides on the inner peripheral surface of the die 151 while being in pressure-contact therewith to bring a surface thereof into a pore-filled state. At this time, a press-fitting margin between the outer peripheral surface of the sintered compact 130 and the inner peripheral surface of the die 151 (diameter difference between an outer diameter of the sintered compact 130 which has been subjected to the primary sizing and an inner diameter of the die 151) is larger than a press-fitting margin between the inner peripheral surface of the sintered compact 130 and the cylindrical portion 152b of the core 152 (diameter difference between the inner diameter of the sintered compact 130 which has been subjected to the primary sizing and the outer diameter of the cylindrical portion 152b of the core 152). After the sintered compact 130 is press-fitted into the inner periphery of the die 151, the sintered compact 130 can be further compressed in the axial direction between the upper punch 153 and the lower punch 154 so as to achieve a further increase in density of the sintered compact 130.

Thereafter, as illustrated in FIG. 17C, the tapered portion 152a of the core 152 is pushed into the inner periphery of the sintered compact 130. As a result, a shape of the tapered portion 152a of the core 152 is transferred onto the inner peripheral surface of the sintered compact 130 to mold the first tapered portion 103. In this manner, the first tapered portion 103 is compression-molded with the tapered portion 152a of the core 152. As a result, the density of the first tapered portion 103 is further increased. In the above-mentioned manner, the sintered compact 130 is molded into a predetermined shape, that is, the same shape as that of the sintered bearing 101 illustrated in FIG. 13.

As described above, in the sizing step, the sintered compact 130 is compression-molded with the sizing mold. Specifically, the second tapered portion 104 of the inner peripheral surface of the sintered compact 130 is subjected only to the compression molding with the tapered portion 142a of the core 142 in the primary sizing step. The cylindrical portion 102 of the inner peripheral surface of the sintered compact 130 is subjected to the compression molding and the pore-filling with the press-fit of the cylindrical portion 152b of the core 152 in the secondary sizing step. The first tapered portion 103 of the inner peripheral surface of the sintered compact 130 is subjected to the compression molding and the pore-filling with the press-fit of the cylindrical portion 152b of the core 152 and the compression molding with the tapered portion 152a of the core 152 in the secondary sizing step. Therefore, a surface opening ratio of the inner peripheral surface of the sintered compact 130 becomes smaller in the order of the second tapered portion 104, the cylindrical portion 102, and the first tapered portion 103. Further, the density of the first tapered portion 103 is higher than a density of the cylindrical portion 102. In this embodiment, the density becomes higher in the order of the second tapered portion 104, the cylindrical portion 102, and the first tapered portion 103.

Further, the outer peripheral tapered portion 106 of the sintered compact 130 is subjected only to the compression molding with the tapered surface 141b1 of the lower die 141b in the primary sizing step. The outer peripheral cylindrical portion 105 of the sintered compact 130 is subjected to the compression molding and the pore-filling with the press-fit into the die 151 in the secondary sizing step. At this time, the amount of compression during the molding of the outer peripheral tapered portion 106 on the cylindrical surface-shaped outer peripheral surface of the sintered compact 130 is larger than the amount of compression during the press-fit of the sintered compact 130 into the die 152. Therefore, the density of the outer peripheral tapered portion 106 is higher than the density of the outer peripheral cylindrical portion 105. Further, the surface opening ratio of the outer peripheral tapered portion 106 and the surface opening ratio of the outer peripheral cylindrical portion 105 change depending on the amount of compression molding, the press-fit margin of each of the regions of the outer peripheral surface of the sintered compact 130, and the like.

In this embodiment, the surface opening ratio of the outer peripheral tapered portion 106 is smaller than the surface opening ratio of the outer peripheral cylindrical portion 105.

Each of the chamfered portions 107 formed at both the axial ends of the inner peripheral surface and at both the axial ends of the outer peripheral surface of the sintered compact 130 is not subjected to the compression with the sizing, and is a surface molded by the compression molding in the compression molding step. Therefore, the chamfered portions 107 have the lowest density (the largest surface opening ratio) in the surface of the sintered compact 130.

Further, in the secondary sizing step, the radial clearance is formed between the outer peripheral tapered portion 106 of the sintered compact 130 and the inner peripheral surface of the die 151. Thus, by the compression molding of the first tapered portion 103 on the inner peripheral surface of the sintered compact 130, there is a fear in that the diameter of the outer peripheral tapered portion 106 molded in the primary sizing step is increased. However, the first tapered portion 103 has a smaller inclination angle with respect to the axial direction than that of the outer peripheral tapered portion 106, and thus has a smaller amount of compression in the secondary sizing. Therefore, effects of the molding of the first tapered portion 103 on the outer peripheral tapered portion 106 are small. Further, accuracy required for the inclination angle of the outer peripheral tapered portion 106 is not so high. Thus, a slight variation does not become a problem.

[Oil-Impregnation Step]

In the oil-impregnation step, inner pores of the sintered compact 130 which has been subjected to the sizing are impregnated with the lubricating oil by a technique such as vacuum impregnation. As the lubricating oil to be contained in the sintered compact 130, for example, an ester-based lubricating oil is used. In particular, ester-based lubricating oil having a kinematic viscosity of 30 mm$^2$/sec or larger and 200 mm$^2$/sec or smaller is preferred. In the manner described above, the sintered bearing 101 is completed.

Figure 24:
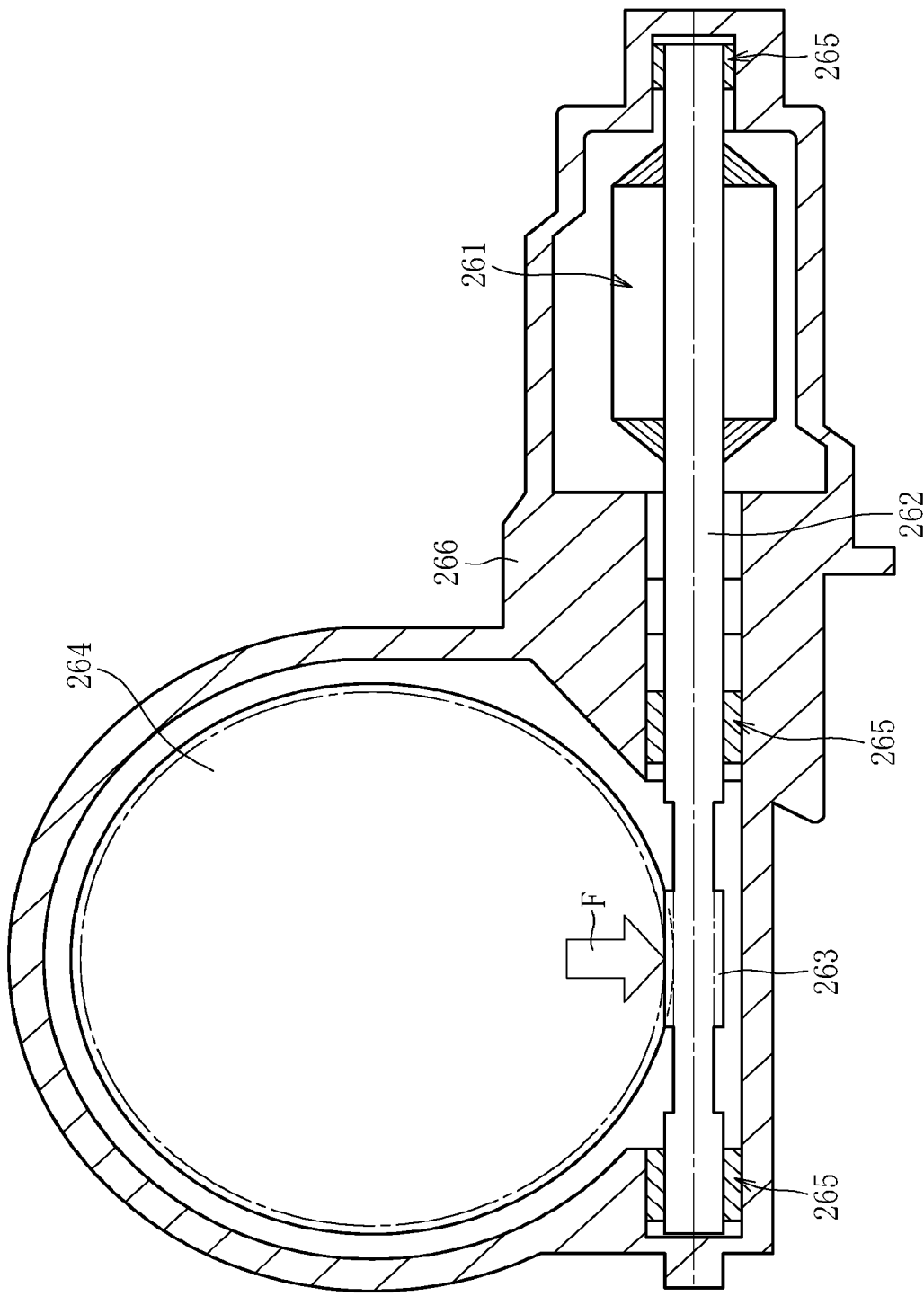
FIG. 24 is a schematic sectional view of a power transmission mechanism for a power window.

The sintered bearing 101 described above is assembled into the power transmission mechanism for a power window illustrated in FIG. 24. Specifically, the shaft 262 is inserted into the inner periphery of each of the sintered bearings 101, while the sintered bearings 101 are press-fitted and fixed to a predetermined position in a housing 266. The sintered bearings 101 of this embodiment are provided in the vicinities of both sides of the worm gear 263 in the axial direction, and are fixed to the housing 266 so that the first tapered portion 103 is positioned on a side closer to the worm gear 263. When the sintered bearing 101 of this embodiment is used as another bearing, that is, the bearing 265 provided at the right end in FIG. 24, the first tapered portion 103 is arranged so as to be positioned on a side closer to the motor 261. A part of the bearing 265 may be a bearing other than the above-mentioned bearing 101. For example, as the bearing arranged at the right end in FIG. 24, a sintered bearing having a straight cylindrical surface as the entire region of an inner peripheral surface may be used.

In the power transmission mechanism for a power window described above, when the motor 261 is driven to rotate the shaft 262, the lubricating oil seeping out from an inside of the sintered bearing 101 or the lubricating oil supplied from an outside is present between the inner peripheral surface of the sintered bearing 101 and the outer peripheral surface of the shaft 262. Under a state in which the warp of the shaft 262 is small, an oil film is formed between the cylindrical portion 102 of the inner peripheral surface of the sintered bearing 101 and the outer peripheral surface of the shaft 262. Through the oil film, the shaft 262 is supported by the cylindrical portion 102 so as to be freely rotatable. When the warp of the shaft 262 becomes large, the shaft 262 is supported by the first tapered portion 103 so as to be freely rotatable through an oil film formed between the first tapered portion 103 of the inner peripheral surface of the sintered bearing 101 and the outer peripheral surface of the shaft 262 in addition to the above-mentioned support provided by the cylindrical portion 102.

The inner peripheral surface of the above-mentioned sintered bearing 101 has the highest density and the smallest surface opening ratio in the first tapered portion 103. Thus, the lubricating oil is less liable to move from the first tapered portion 103 into the inner pores of the sintered bearing 101. Therefore, a pressure of the lubricating oil which is present between the first tapered portion 103 and the shaft 262 is maintained, thereby increasing rotation accuracy of the shaft 262.

Further, in the above-mentioned sintered bearing 101, the outer peripheral tapered portion 106 is compression-molded on a part of the outer peripheral surface, that is, on an outer diameter side of the first tapered portion 103, in the primary sizing step. Therefore, on the outer peripheral surface, the density of the outer peripheral tapered portion 106 becomes higher than that in another region. As described above, in the sintered bearing 101, a density of an axial region of the first tapered portion 103 is increased from an outer periphery side. As a result, the lubricating oil is further less liable to move from the first tapered portion 103 into the inner pores of the sintered bearing 101. Thus, the rotation accuracy of the shaft 262 is further increased.

The embodiment of the second invention of the present application is not limited to the embodiment described above. Now, description is made of other embodiments of the second invention. Parts having the same functions as those in the embodiment described above are denoted by the same reference symbols, and redundant description thereof is omitted.

Figure 18:
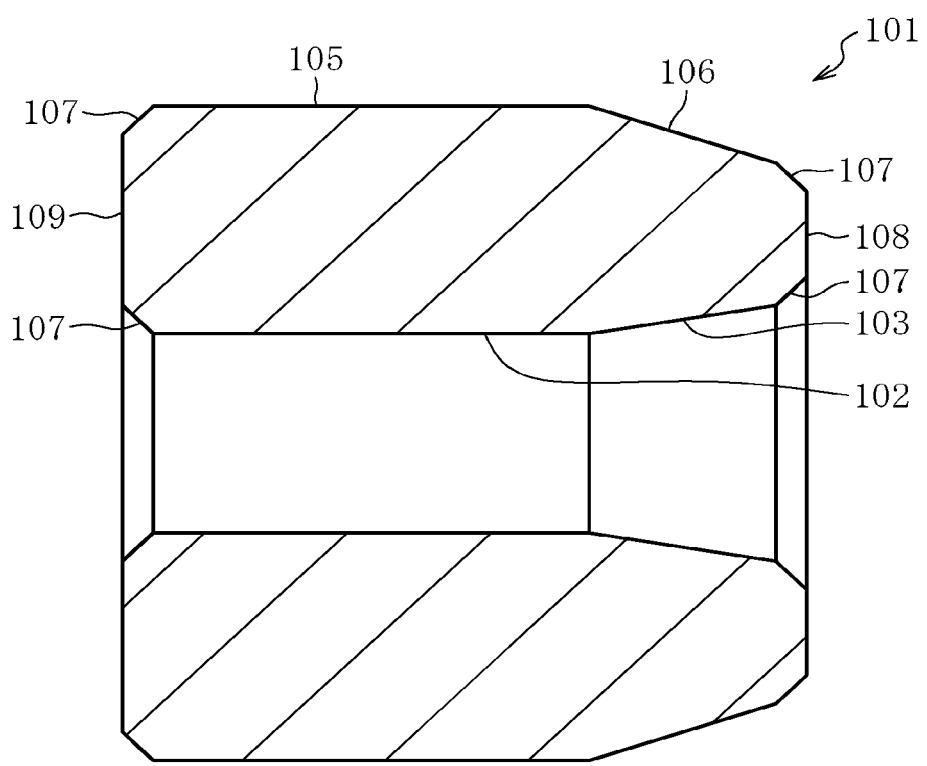
FIG. 18 is a sectional view of a sintered bearing according to another embodiment of the second invention.

The sintered bearing 101 illustrated in FIG. 18 is different from that of the embodiment described above in that the second tapered portion 104 is not formed on the inner peripheral surface. Specifically, in the sintered bearing 101, another axial end (end portion on a side opposite to the first tapered portion 103) of the cylindrical portion 102 of the inner peripheral surface reaches the chamfered portion 107. In this case, after the outer peripheral tapered portion 106 is molded on the outer peripheral surface of the sintered compact 130 in the primary sizing, the cylindrical portion 102 and the first tapered portion 103 are molded on the inner peripheral surface of the sintered compact in the secondary sizing.

Further, in the embodiment described above, there has been described the case where the outer peripheral tapered portion 106 is molded in the primary sizing. However, the molding of the outer peripheral tapered portion 106 is not limited thereto. For example, the outer peripheral tapered portion 106 may be molded in the secondary sizing. Specifically, for example, after the second tapered portion 104 is molded on the inner peripheral surface of the sintered compact 130 in the primary sizing, the cylindrical portion 102 and the first tapered portion 103 may be molded on the inner peripheral surface of the sintered compact 130 while the outer peripheral tapered portion 106 may be molded on the outer peripheral surface of the sintered compact 130 in the secondary sizing (not shown).

Figure 19:
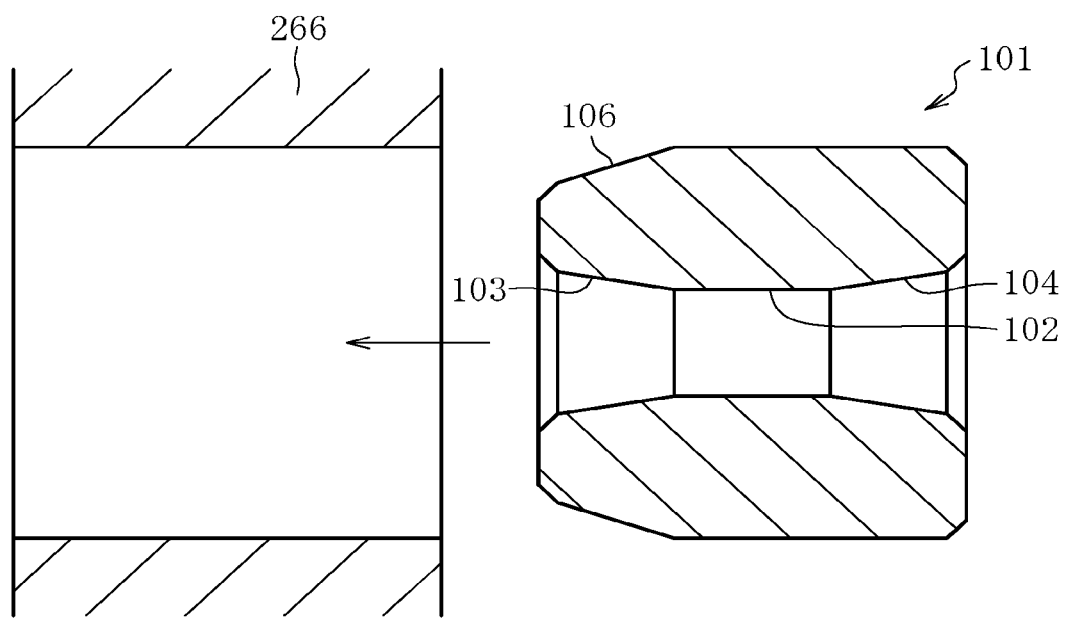
FIG. 19 is a sectional view for illustrating an example of a method of fixing the sintered bearing to a housing.

Further, when the sintered bearing 101 is assembled into the housing 266, the sintered bearing 101 is inserted (for example, press-fitted) into the inner periphery of the housing 266 from the outer peripheral tapered portion 106 side as illustrated in FIG. 19. Then, by bringing the outer peripheral tapered portion 106 and an opening portion of the housing 266 into abutment against each other, the sintered bearing 101 is guided to the housing 266. Assembly work of the sintered bearing 101 to the housing 266 can be smoothly carried out.

Figure 20:
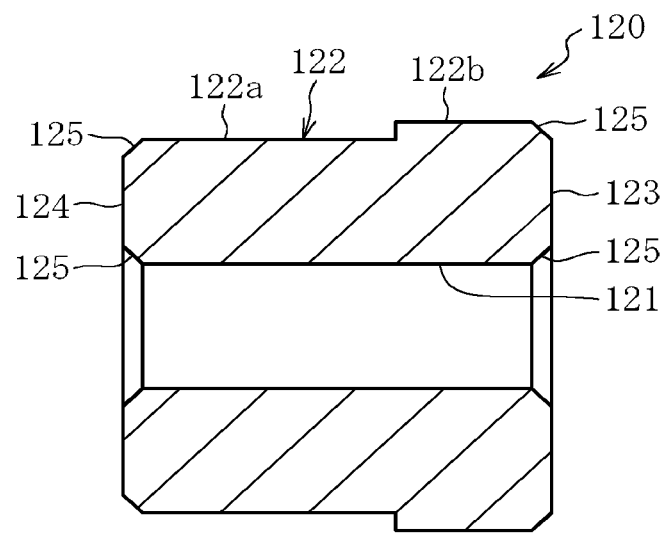
FIG. 20 is a sectional view of a green compact according to another embodiment of the second invention.

Further, in the embodiment described above, there has been described the case where the outer peripheral surface of the green compact 120 is formed as the straight cylindrical surface. However, the outer peripheral surface of the green compact 120 is not limited thereto. For example, as illustrated in FIG. 20, a small-diameter portion 122a and a large-diameter portion 122b may be formed on the outer peripheral surface 122 of the green compact 120. The primary sizing is performed on the sintered compact 130 obtained by sintering the green compact 120 with the primary sizing mold 140 illustrated in FIG. 21. The primary sizing mold 140 is different from the primary sizing mold 140 illustrated in FIG. 16 in that the die 141 is formed integrally therewith and the entire region of the inner peripheral surface (molding surface) in the axial direction is formed into a straight cylindrical surface shape.

Figure 21A:
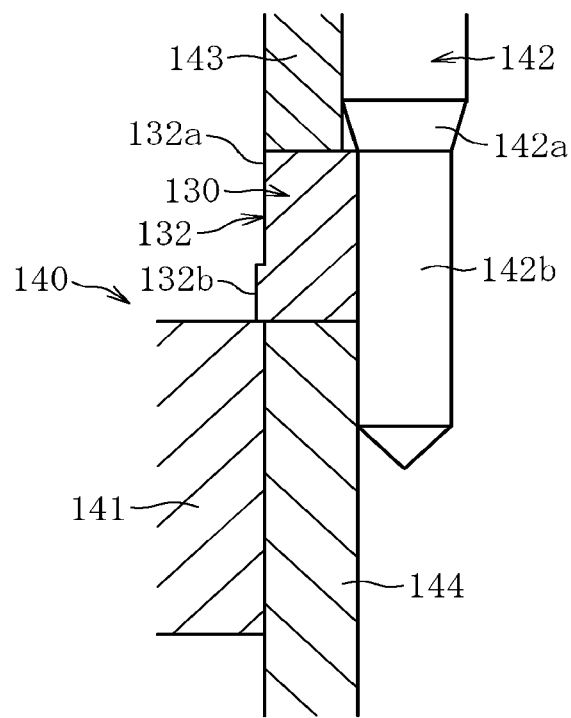
FIG. 21A is a sectional view for illustrating an initial stage of a primary sizing step according to another embodiment.
Figure 21B:
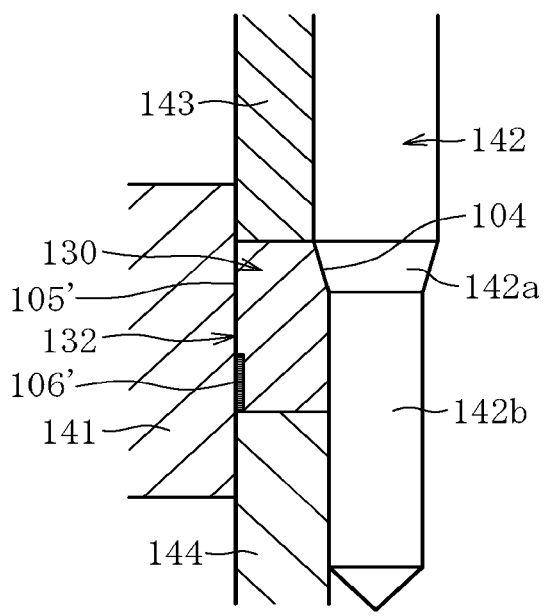
FIG. 21B is a sectional view for illustrating a stage during the primary sizing step according to the another embodiment.

Specifically, as illustrated in FIG. 21A, the sintered compact 130 is arranged in the primary sizing mold 140 so that the large-diameter portion 132b is positioned on a lower side. Thereafter, by press-fitting the sintered compact 130 into the inner periphery of the die 141, the outer peripheral surface 132 of the sintered compact 130 is molded into the straight cylindrical surface shape with the inner peripheral surface of the die 141 (see FIG. 21B). After the sintered compact 130 is press-fitted into the die 141, the tapered portion 142a of the core 142 is pushed into the inner periphery of the sintered compact 130. As a result, the second tapered portion 104 is molded at an upper end of the inner peripheral surface of the sintered compact 130. At this time, a region of the outer peripheral surface 132 of the sintered compact 130, which is obtained by compressing the small-diameter portion 132a, becomes a low-density portion 105', whereas a region of the outer peripheral surface 132 of the sintered compact 130, which is obtained by compressing the large-diameter portion 132b, becomes a high-density portion 106' (black region).

Figure 22A:
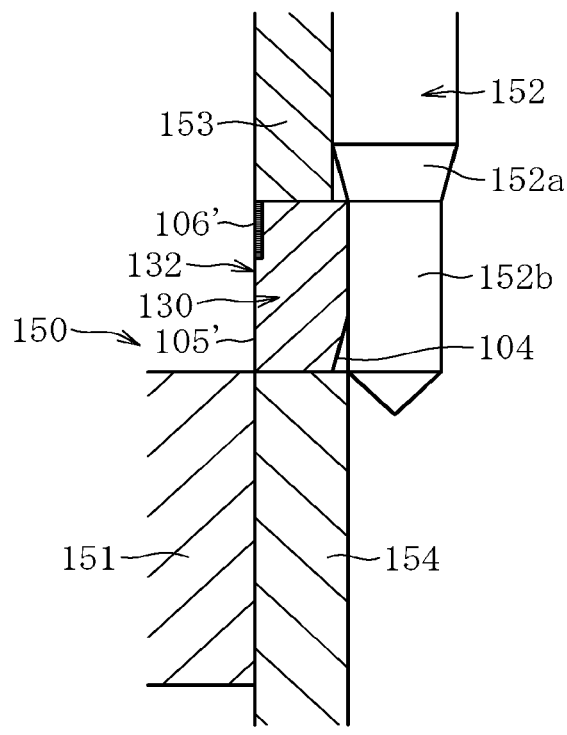
FIG. 22A is a sectional view for illustrating an initial state of a secondary sizing step according to the another embodiment.
Figure 22B:
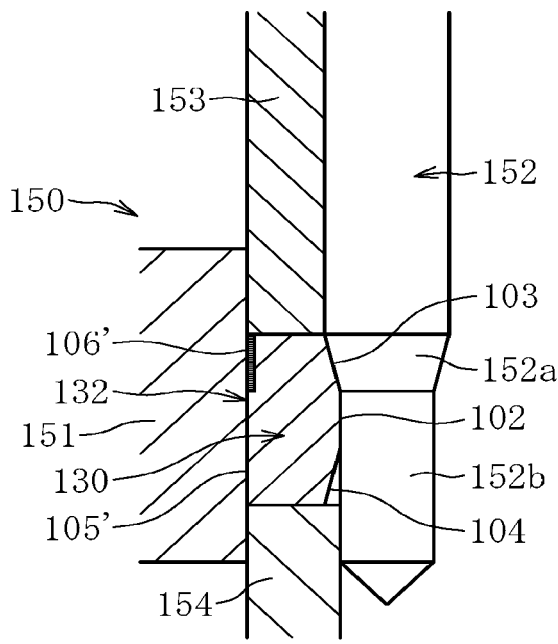
FIG. 22B is a sectional view for illustrating a stage during the secondary sizing step according to the another embodiment.

Thereafter, the secondary sizing is performed on the sintered compact 130 with the secondary sizing mold 150 illustrated in FIG. 22A and FIG. 22B. Specifically, first, as illustrated in FIG. 22A, the sintered compact 130 is arranged in the secondary sizing mold 150 so that the high-density portion 106' is positioned on an upper side. The cylindrical portion 152b of the core 152 is press-fitted into the inner periphery of the sintered compact 130. Thereafter, as illustrated in FIG. 22B, the sintered compact 130 is press-fitted into the inner periphery of the die 151, while the tapered portion 152a of the core 152 is pushed into the inner periphery of the sintered compact 130. In the manner described above, the cylindrical portion 102 and the first tapered portion 103 are molded on the inner peripheral surface of the sintered compact 130.

Figure 23:
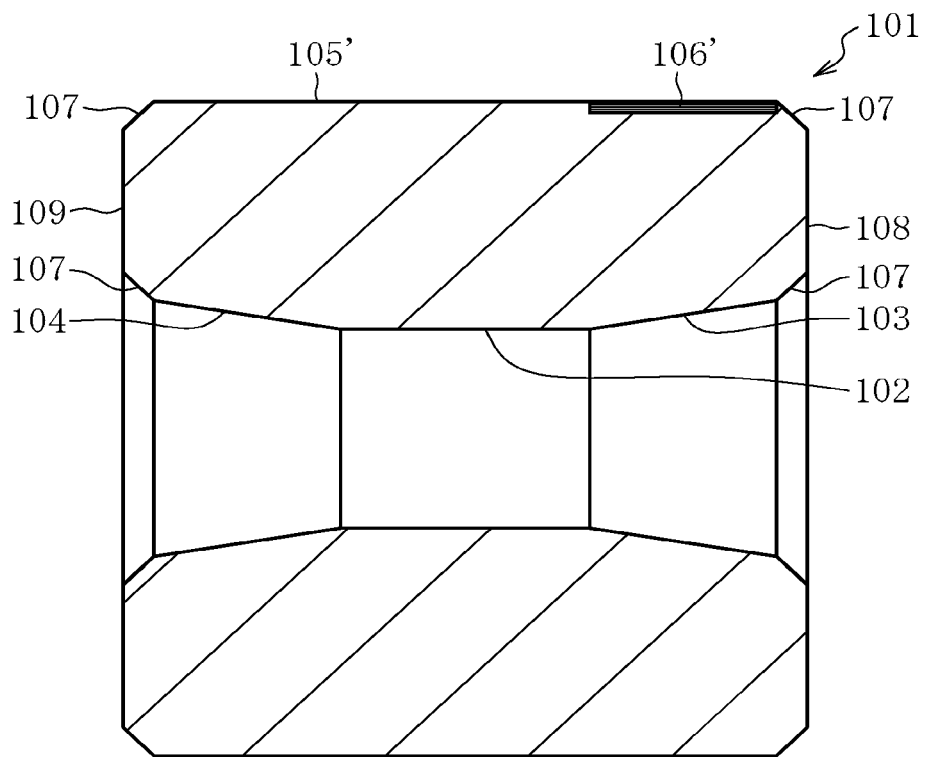
FIG. 23 is a sectional view of a sintered bearing manufactured through the primary sizing step illustrated in FIG. 21 and the secondary sizing step illustrated in FIG. 22.

The sintered compact 130 manufactured through the steps described above is impregnated with the lubricating oil, thereby obtaining the sintered bearing 101 illustrated in FIG. 23. Similarly to the embodiment described above, the cylindrical portion 102, the first tapered portion 103, and the second tapered portion 104 are formed on the inner peripheral surface of the sintered bearing 101. On the other hand, the outer peripheral surface of the sintered bearing 101 is formed by a straight cylindrical surface. On the outer peripheral surface of the sintered bearing 101, the high-density portion 106' is formed in an axial region of the first tapered portion 103. In the illustrated example, the high-density portion 106' is formed at one axial end of the outer peripheral surface of the sintered bearing 101, whereas the low-density portion 105' is formed so as to be adjacent to another axial side of the high-density portion 106'. The low-density portion 105' and the high-density portion 106' are continuous cylindrical surfaces having the same diameter.

Further, in the embodiment described above, there has been described the case where the clearance is formed between the cylindrical portion 142b of the core 142 and the inner peripheral surface of the sintered compact 130 in the primary sizing step. However, the formation of the clearance is not limited thereto. For example, in the primary sizing step, a diameter of the cylindrical portion 142b of the core 142 is set to the same diameter as the inner diameter of the sintered compact 130 so that the clearance between the cylindrical portion 142b and the inner peripheral surface of the sintered compact 130 may be set to substantially zero (for example, under a lightly press-fitted state). In this case, the outer peripheral surface of the sintered compact 130 is compressed by the tapered surface 141b1 of the lower die 141 under a state in which the inner peripheral surface of the sintered compact 130 is supported by the cylindrical portion 142b from the inner diameter side. Thus, the outer peripheral tapered portion 106 can be reliably molded on the sintered compact 130.

Further, in the embodiment described above, the outer peripheral surface of the sintered compact 130 and the cylindrical surface 141a1 of the upper die 141a are fitted through the radial clearance therebetween in the primary sizing step. However, the radial clearance is not limited thereto. The inner diameter of the upper die 141a and the outer diameter of the sintered compact 130 may be set to the same diameter so that the clearance between the cylindrical surface 141a1 of the upper die 141a and the outer peripheral surface of the sintered compact 130 may be set to substantially zero (for example, under the lightly press-fitted state).

Further, in the embodiment described above, there has been described the case where the sintered compact 101 is applied to the power transmission mechanism for a power window. The application of the sintered compact 101 is not limited thereto. The sintered compact 101 may be used for another purpose. For example, the sintered compact 101 can be applied to a vibration motor functioning as a vibrator of a cell phone or the like.

Further, in the embodiment described above, there has been described the case where the shaft 262 is rotated with the sintered compact 101 being fixed. However, the use of the sintered bearing 101 is not limited thereto. The sintered compact 101 may be used in a case where the sintered bearing 101 is rotated with the shaft 262 being fixed or a case where both of the shaft 262 and the sintered bearing 101 are rotated.

The present invention is not limited to the embodiments described above. The present invention may be carried out in various modifications without departing from the gist of the present invention.

REFERENCE SIGNS LIST 1 sintered bearing
2 cylindrical portion

3 one-side increased-diameter portion (increased-diameter portion)
4 another-side increased-diameter portion
20 green compact
30 sintered compact
30' sintered compact
40 primary sizing mold
41 die (first die)
42 core (first sizing core)
42a another-side increased-diameter portion molding surface
50 secondary sizing mold
51 die (second die)
52 core (second sizing core)
52a cylindrical portion molding surface
52b one-side increased-diameter portion molding surface (increased-diameter portion molding surface)
101 sintered bearing
102 cylindrical portion
103 first tapered portion (increased-diameter portion)
104 second tapered portion
105 outer peripheral cylindrical portion (low-density portion)
106 outer peripheral tapered portion (high-density portion)
107 chamfered portion
120 green compact
130 sintered compact
140 primary sizing mold
150 secondary sizing mold

The invention claimed is:

1. A sintered bearing comprising, on an inner peripheral surface of the bearing, a cylindrical portion having a constant diameter and an increased-diameter portion having a diameter that gradually increases in a direction away from one side of the cylindrical portion in an axial direction of the sintered bearing, the increased-diameter portion being adjacent to the cylindrical portion on the one side in the axial direction, an end portion of the one side in the axial direction of the cylindrical portion and an end portion of another side in the axial direction of the increased-diameter portion coinciding, and the cylindrical portion and the increased-diameter portion being molded by performing sizing on a sintered compact having a tubular shape, which is introduced into a die, wherein a metal structure of the cylindrical portion has an expansion along a direction of ironing by a sizing core for sizing due to the cylindrical portion having a surface molded by ironing with the sizing core, wherein a metal structure of the increased-diameter portion has an expansion along a direction of ironing by the sizing core and a higher density than the metal structure of the cylindrical portion due to the increased-diameter portion having a surface compression-molded through ironing with the sizing core, and wherein a metal structure of an outer peripheral surface of the sintered bearing has an expansion along a direction of ironing by the die due to the outer peripheral surface being molded by ironing with the die.

\* \* \* \* \*